(12) United States Patent
Buerk et al.

(10) Patent No.: US 9,363,291 B2
(45) Date of Patent: Jun. 7, 2016

(54) SYSTEMS AND METHODS FOR MANAGING LOST DEVICES OF MULTIPLE TYPES WITH MULTIPLE POLICIES USING MELDED PROFILES ASSOCIATED WITH GROUPS

(71) Applicant: ConnectWise Inc., Tampa, FL (US)

(72) Inventors: Gregory Francis Buerk, Whitehouse, OH (US); Scott Logan, Arlington, MA (US)

(73) Assignee: CONNECTWISE, INC., Tampa, FL (US)

( * ) Notice: Subject to any disclaimer, the term of this patent is extended or adjusted under 35 U.S.C. 154(b) by 13 days.

(21) Appl. No.: 14/448,359

(22) Filed: Jul. 31, 2014

(65) Prior Publication Data

US 2015/0040239 A1 Feb. 5, 2015

Related U.S. Application Data

(60) Provisional application No. 61/861,054, filed on Aug. 1, 2013.

(51) Int. Cl.
*H04L 29/06* (2006.01)
*G06F 21/60* (2013.01)
*G06F 21/88* (2013.01)

(52) U.S. Cl.
CPC .............. *H04L 63/20* (2013.01); *G06F 21/60* (2013.01); *G06F 21/88* (2013.01); *G06F 2221/2143* (2013.01); *G06F 2221/2149* (2013.01)

(58) Field of Classification Search
None
See application file for complete search history.

(56) References Cited

U.S. PATENT DOCUMENTS

| 5,872,928 | A | 2/1999 | Lewis et al. |
|---|---|---|---|
| 5,889,953 | A | 3/1999 | Thebaut et al. |
| 6,381,639 | B1 | 4/2002 | Thebaut et al. |
| 7,159,125 | B2 | 1/2007 | Beadles et al. |
| 7,171,459 | B2 | 1/2007 | Sanghvi et al. |
| 8,060,620 | B2 | 11/2011 | Lu et al. |

(Continued)

FOREIGN PATENT DOCUMENTS

WO WO-2011/002205 2/2011

OTHER PUBLICATIONS

Good Technology, Good Mobile Manager Administrators Guide, Version 2.5.0, Apr. 28, 2014, Sunnyvale, California.

(Continued)

*Primary Examiner* — Michael R Vaughan
(74) *Attorney, Agent, or Firm* — Foley & Lardner LLP; John D. Lanza

(57) ABSTRACT

This disclosure facilitates managing lost devices. In some embodiments, a system receives a first device type from a first agent on a first device, and a different second device type from a second agent on a second device. The system receives a first group associated with the first device and a different second group associated with the second device. The system determines that the first device and the second device are lost and accesses a database storing first and second configuration classes associated with the first and second devices, respectively. The system creates first and second device-dependent classes based on the first and second device types and the first and second configuration classes, respectively. The system melds the first device-dependent class into a first melded profile and the second device-dependent class into a second melded profile, using the respective groups, and applies the melded profiles to the corresponding device.

30 Claims, 44 Drawing Sheets

(56) References Cited

U.S. PATENT DOCUMENTS

| | | | |
|---|---|---|---|
| 8,082,432 B2 | 12/2011 | Fehrle | |
| 8,477,028 B2* | 7/2013 | Kuncl | H04M 1/67 340/539.32 |
| 8,509,212 B2 | 8/2013 | Sanjeev et al. | |
| 2003/0074577 A1* | 4/2003 | Bean | G06F 21/88 726/35 |
| 2005/0188056 A1 | 8/2005 | Kangas et al. | |
| 2008/0070495 A1 | 3/2008 | Stricklen et al. | |
| 2008/0214161 A1 | 9/2008 | Jakl | |
| 2009/0042598 A1 | 2/2009 | Blinnikka et al. | |
| 2014/0148140 A1 | 5/2014 | Ahn et al. | |

OTHER PUBLICATIONS

Honeycutt, Jerry, An Overview of Group Policy Preferences, Microsoft Corporation publication, Nov. 2007, Redmond, Washington.

Internet Archive Wayback Machine record of N-able, a SolarWinds company, N-central 9.2 Overview, company web site, Aug. 6, 2013, Ottawa, Ontario, Canada.

Kaseya, Policy Management User Guide, version 6.5 and 1.1, Jan. 23, 2014, Jersey, British Isles.

Maas360 by Fiberlink, an IBM company, User Guide: Maas360 Healthcare IT Compliance Service, version 3.2011, 2011, Blue Bell, Pennsylvania.

Microsoft Corporation, Active Directory Users, Computers, and Groups, TechNet documentation, captured Jul. 6, 2014, Redmond, Washington.

Microsoft Corporation, Group Policy processing and precedence, TechNet documentation, Apr. 3, 2013, Redmond, Washington.

Microsoft Corporation, How to control winning gpo, TechNet Windows Server blog, Dec. 6, 2010, Redmond, Washington.

N-able Technologies, a SolarWinds company, N-Central 6 Customer Manual, version 6.0, 2007, Ottawa, Ontario, Canada.

Wikipedia, the free encyclopedia, Active Directory, captured Jul. 6, 2014, San Francisco, California.

* cited by examiner

Wifi settings 701a 701b 301a

| SSID | Security | Password |
|---|---|---|
| guest | none | |
| dev | WEP | d3v3l1op |
| admin | WPA2 | 4dm1x |
| ⋮ | ⋮ | ⋮ |

701c
303c
303d
303e

Email settings 701d 701e 701f 701g 301b

| Account | Server | Type | User | Password |
|---|---|---|---|---|
| john@company.com | mail.company.com | IMAP | john | 3m4iL |
| ⋮ | ⋮ | ⋮ | ⋮ | ⋮ |

701h
303f

Passcode security 701i 301c

| Setting | Value |
|---|---|
| Passcode value | 14785 |
| Minimum length | 5 |
| ⋮ | ⋮ |

701j
303g
303h

Restrictions 701k 301d

| Setting | Value |
|---|---|
| Block video service | yes |
| Restrict browser access | no |
| ⋮ | ⋮ |

SYSTEMS AND METHODS FOR MANAGING LOST DEVICES OF MULTIPLE TYPES WITH MULTIPLE POLICIES USING MELDED PROFILES ASSOCIATED WITH GROUPS

CROSS-REFERENCE TO RELATED PATENT APPLICATIONS

This application claims priority under 35 U.S.C. §119 of U.S. Provisional Patent Application No. 61/861,054, titled "SYSTEMS AND METHODS FOR PROVIDING MELDED PROFILES TO MANAGE MULTIPLE DEVICE TYPES," and filed on Aug. 1, 2013, the entirety of which is hereby incorporated by reference.

FIELD OF THE DISCLOSURE

The present disclosure generally relates to management of computing devices. More specifically, the present disclosure relates to managing computing devices that are lost.

BACKGROUND OF THE INVENTION

In a managed computing environment, a server can manage multiple computing devices that are used in various ways. As the number of devices and types of uses increase, it may be challenging to effectively manage the devices in some scenarios.

SUMMARY OF THE INVENTION

Managing large numbers of computing devices can be challenging. Devices can be managed using a one-at-a-time break-fix methodology, for example, a technician repairing each problem as it arises, but this can quickly become economically infeasible with many devices. Computing devices are becoming less expensive, so there may be more of them all the time, and they may also be more mobile, such as cell phones and laptops, which can compound the problems associated with managing them.

A policy-based management on a management server can facilitate providing a device management service. The configuration and operation of devices can be defined by policies, which can then be applied to the individual devices and enforced by a central management system. For example, one policy might be appropriate for the configuration of desktop systems, and a different policy might be appropriate for the configuration of mail servers. Even though the same devices may be used for both desktops and mail servers, using different policies can allow the devices to be set up and managed separately. For example, a first policy can be used for all desktops, and a second policy for all web servers. Grouping devices this way according to function, and associating policies with groups, can facilitate the management of larger numbers of devices because the number of groups may be smaller than the number of devices.

In some instances, policies may be further refined. For example, a desktop machine for an engineer may be managed differently from a desktop machine for a secretary because they may, e.g., have different applications, backup policies, security restrictions, etc. One or more of these differences can create a different policy, and each of those policies may have substantial duplication. To facilitate the management of these multiple policies, it may be possible to represent each different configuration using a configuration class. In this way, each group can be associated with a set of configuration classes that can be "melded" together to create a profile that can be used for the group. The configuration classes can be associated with groups in different ways that can overlap as needed.

There may be many different types of devices that can be managed. For example, the devices being managed may include personal computers running MICROSOFT WINDOWS, or personal computers by APPLE COMPUTER running OS X, or server devices running LINUX, tablets running ANDROID, IPHONEs running IOS, and so on. Each configuration class can apply to some or all of these devices. Each configuration class can have code associated with it that can adapt it to the devices to which it applies. Organizing configuration classes in this manner may facilitate making the code simple and well-contained, while allowing for a complex and rich management structure by combining multiple configuration classes, controlled by groups, into device-specific melded profiles and then applying those profiles to the devices. This organization may also facilitate maintenance of the device management system, and may solve problems associated with managing large numbers of diverse devices.

The managed devices can have an agent running on them that can collect device configuration information, such as the hardware type and the operating system running on the device, and can send this device configuration information to the management server. The management server can defines groups of devices based on user input, device configuration information, or both. For example, the server may define a group of ANDROID tablets based on device configuration information, and may define a group of devices used by secretaries based on user input. The server may define a group of devices serving as web servers based on device configuration information that includes the software installed on the devices, and the list of devices in the group may be adjusted based on user input. The server can generate device-specific configurations from the configuration classes, using the device configuration information, and can then meld these device-specific configurations together based on the group definitions to create a device-specific profile for each device. The server may then send each device-specific profile to the agent on the device, and the agent can apply the device-specific profile to the device.

The device management system may be used for handling lost devices. This may be of particular importance for mobile devices such as cell phones and laptops. The device groups can facilitate providing different types of management for different types of lost devices. For example, sales people may have sensitive data on their phones, both in contacts and email, but it may be backed up on a server, so the policy for a lost sales phone can be to erase the data on it right away. By way of contrast, engineers may have custom development and special setups on their phones, and may usually keep their phones on the premises, so the policy for a lost engineering phone may instead be to sound an alarm on the device to help find it. Configuration classes may also facilitate managing lost devices, because policy decisions can apply to all devices, and the code associated with the configuration classes to generate the device-specific configurations can use whatever features are appropriate on the specific devices to implement the configuration classes.

The network connectivity of some of the devices may use the cellular data network. For example, a cell phone may use the cellular data network for data communications. The data plans provided by cellular providers may be complex and difficult to understand for end users, and may include options that can be expensive. For example, the price of data connectivity may increase after a certain amount of data is transferred, or it may be higher if the device is roaming. It may be desirable to monitor and manage these costs, and it may be important to manage the devices in a different way depending on the device. For example, sales people involved in international sales may use a cellular plan that allows data roaming inexpensively but has a relatively low cap on total data transfer amount, but engineering staff may use a cellular plan that allows large data transfers but charges for data roaming. In this example, it may be desirable to have alerts when the sales staff gets near the data cap, and it may be desirable to disable data roaming if an engineer leaves the country. The management server can facilitate this kind of management by using different configuration classes for alerts on data volume and disabling international roaming, applying the configuration classes to different types of devices, and using groups to create melded profiles for sales and engineering that include the appropriate configuration classes.

When a new device is added to the devices being managed by the server, it can automatically be assigned to certain groups based on rules that define group assignment for new devices. For example, a company may wish to be able to track any device that costs over a certain price. The device management server can define a group for "expensive" devices, and profiles in that group can include a configuration class that installs tracking software on the device. When the device first reports to the management server, a rule can check the device type in a table of costs, and if the device is over a threshold, the server can associate the device with the "expensive" group.

The management server may be used to manage devices from several different companies. For example, the device management system may be used by a managed service provider (MSP) that is in the business of outsourcing information technology (IT) services for a fee. In this case, it may be desirable to define a separate group for each company that is a customer of the MSP. It may also be desirable to control other functions of the device management system, such as reporting and billing, using those same groups. The MSP may also wish to define groups within each company. For example, it may be desirable to define groups that correspond to the physical location of an office with the devices in the group, or it may be desirable to define groups that correspond to an organizational unit using the devices in the group.

Groups may be defined in a hierarchy. For example, groups may be defined that correspond to the geographic location of the devices. In this example, there may be one set of groups defining the city, another set of groups defining the region, another set of groups defining the country, and so on. These location-based groups form a natural hierarchy, where certain cities are part of a specific region, and so on. The policies associated with the groups can be set up with an inheritance, so that any policies associated with a group are also applied to the groups within it.

Groups may also be defined in a non-hierarchical way. For example, there may be a group of all device used by senior management of a company. This group may be arbitrary and may not have any inheritance relationship with any other group.

The melding process may combine configurations from more than one configuration class. For example, if a single device is a member of two groups, and each of the groups refers to a configuration class that includes the same setting, then melding the two configuration classes can produce a result for that setting. The executable code associated with the configuration classes may produce the final setting that is applied to the device. In some embodiments, the setting may not be implemented on the device, and the melded profile may not include any value for the setting. For example, the setting may indicate whether or not to enable the global positioning system (GPS) for locating the device, and the device may not have any GPS receiver built in. In some embodiments, the device may support multiple values for a setting, and the melded profile may include all the values in the individual configuration classes. For example, the setting may indicate the description of a WiFi connection for the device, and the device may implement searching for multiple WiFi connections and using the first available connection. In this case, the melded profile may include the descriptions for all of the WiFi connections in the configuration classes. In some embodiments, the setting itself may define a "preferred" configuration that can be selected by the melding process. For example, the setting may control the minimum length of a passcode that is used to secure the device. In this example, it may be desirable to use the longest minimum length defined by all of the configuration classes, so the melded profile may use the longest length. In some embodiments, the configuration classes may have priorities associated with them, and the melding process may select the setting from the configuration class with the highest priority. In some embodiments, the configuration classes may be defined to have an implicit priority defined by inheritance, where sub-groups override the outer group, and in these embodiments, the melded profile may use the setting value from the sub-group. In some embodiments, the configuration classes may be defined to have an implicit priority defined by inheritance, where the enclosing group overrides the groups it includes, and in these embodiments, the melded profile may use the setting value from the enclosing group.

Some settings may incorporate values that are dependent on the specific device. For example, a setting may incorporate the email address of the user of the device. The melding module can incorporate information from other management data available to the management server in order to create the melded profile for the device. In one embodiment, the melding module may implement substitution strings, where a string that appears in setting value in a certain specific format can indicate that it can be substituted by a value that is specific to the device. For example, the substitution string "%contactemail%" may be substituted with the email address of the user of the device by the melding process.

A device may change in such a way that its melded profile changes. For example, the operating system of the device may be upgraded to a new version, and this may enable a capability that was not previously available on the device. The agent may report the update of the device configuration information to the server, the server can generate a new melded profile for the device, the new melded profile can incorporate the new setting that is now applicable to the device, and the server can send the new profile to the agent to apply to the device. In this way, the device management system can properly maintain the configuration of devices even as they are upgraded with new capabilities.

At least one aspect of the present disclosure is directed to a system for managing lost devices via a computer network. In some embodiments, the system includes a computer network and a server. The server can be configured to receive, from a first agent executing on a first device, a first device type. The server can be configured to receive, from a second agent executing on a second device, a second device type, the second device type different from the first device type. The server can be configured to receive, from a user interface, a first group associated with the first device and a second group associated with the second device, the second group different from the first group. The server can be configured to determine that the first device is lost. The server can be configured to determine that the second device is lost. The server can be configured to access, responsive to determining that at least one of the first device and second device is lost, a database storing a first configuration class associated with the first device and a second configuration class associated with the second device. The server can be configured to create, based on the first device type and the first configuration class, a first device-dependent class. The server can be configured to create, based on the second device type and the second configuration class, a second device-dependent class. The server can be configured to meld, based on the first group, the first device-dependent class into a first melded profile. The server can be configured to meld, based on the second group, the second device-dependent class into a second melded profile. The server can be configured to apply the first melded profile to the first device that is lost and the second melded profile to the second device that is lost.

In some embodiments, the server is further configured to receive, from a second user interface, an indication that the first device is lost.

In some embodiments, the first configuration class includes a first setting operable to control a first aspect of a third device, and a second setting operable to control a second aspect of a fourth device. The first aspect and the second aspect can be associated with a management function.

In some embodiments, the first device-dependent class includes a first device setting determined based on the first setting and the first device type, the third device type same as the first device type, and a second device setting determined based on the first setting and the first device type, the fourth device type same as the first device type and the first aspect different from the second aspect.

In some embodiments, the first melded profile includes the first device-dependent class, the first-device dependent class associated with the first group, and a third device-dependent class associated with the first group and the first aspect. The first device can be associated with the first group. The first device setting of the first device-dependent class can be combined with the first device setting of the third device-dependent class by selecting at least one of a priority of the first device setting, a list of the first device setting, and a computation based on the first device setting.

In some embodiments, the server is further configured to access a translation mapping a plurality of input strings into a plurality of output strings. The server can be configured to select, from the first melded profile, a variable string. The server can be configured to map, based on the translation, the variable string to a variable value. The server can be configured to replace, in the first melded profile, the variable string with the variable value.

In some embodiments, the server is further configured to receive, from the first agent, a configuration of the first device. The server can be configured to select, responsive to the receiving of the configuration, based on the configuration, a third group. The server can be configured to associate, responsive to the selection, the first device with the third group.

In some embodiments, the server is further configured to receive, from the first agent, a configuration of the first device. The server can be configured to create, responsive to the receiving of the configuration, based on the first device type, the first configuration class, and the configuration, a third device-dependent class The server can be configured to meld, responsive to the creating, based on the first group, the third device-dependent class into a third melded profile. The server can be configured to apply, responsive to the third melded profile being different from the first melded profile, the third melded profile to the first device.

In some embodiments, the server is further configured to send, to the first agent, responsive to the indication that the first device is lost, an instruction indicating that the first device is lost.

In some embodiments, the first agent is further configured to receive the indication that the first device is lost. The first agent can be configured to modify, responsive to the receiving, a frequency of contacting the server to be more frequent.

In some embodiments, the first agent is further configured to receive the indication that the first device is lost. The first agent can be configured to determine, responsive to the receiving, an indication of an activity on the first device, the indication based on a detection of one condition selected from an unlocking of the first device, a movement of the first device, and a starting of an application on the first device. The first agent can be configured to acquire, responsive to the indication of the activity, an image from a camera on the first device. The first agent can be configured to transmit, to the server responsive to the acquiring, the image.

In some embodiments, the server is further configured to receive, from the first agent, a record of cellular data usage on the first device. The server can be configured to access, responsive to receiving the record of cellular data usage, a third configuration class associated with the first device, the third configuration class including one configuration selected from an enabling of data roaming, a setting of maximum utilized bandwidth, and an enabling of cellular data based on time of day. The server can be configured to create, based on the first device type and the third configuration class, a third device-dependent class. The server can be configured to meld, based on the first group, the third device-dependent class into a third melded profile. The server can be configured to apply, responsive to the melding, the third melded profile to the first device.

In some embodiments, the server is further configured to access the first configuration class including a first plurality of device-independent settings. The server can be configured to use the first configuration class including the plurality of first device-independent settings to create a plurality of first device-dependent classes for the first device. The server can be configured to meld, based on the first group, the first plurality of device-dependent classes into the first melded profile.

In some embodiments, the server is further configured to use a priority of each of the first plurality of device-dependent classes to generate the first melded profile.

In some embodiments, the server is further configured to access the first configuration class including a first device-independent setting for at least one of an application on the first device and an operating system of the first device. The server can be configured to use the first configuration class including the first device-independent setting to create a first device-dependent class for the first device. The server can be configured to meld, based on the first group, the first device-dependent class into the first melded profile.

At least one aspect is directed to a method for managing lost devices via a computer network. The method can include receiving, by a server from a first agent executing on a first device, a first device type. The method can include receiving, by the server from a second agent executing on a second device, a second device type, the second device type different from the first device type. The method can include receiving, by the server from a user interface, a first group associated with the first device and a second group associated with the second device, the second group different from the first group. The method can include determining, by the server, that the first device is lost. The method can include determining, by the server, that the second device is lost. The method can include accessing, by the server responsive to determining that at least one of the first device and second device is lost, a database storing, in memory, a first configuration class associated with the first device and a second configuration class associated with the second device. The method can include creating, by the server, based on the first device type and the first configuration class, a first device-dependent class. The method can include creating, by the server, based on the second device type and the second configuration class, a second device-dependent class. The method can include melding, by the server based on the first group, the first device-dependent class into a first melded profile. The method can include melding, by the server based on the second group, the second device-dependent class into a second melded profile. The method can include applying, by the server, the first melded profile to the first device that is lost and the second melded profile to the second device that is lost.

At least one aspect is directed to a non-transitory computer readable medium storing instructions that, when executed by one or more processors, facilitate managing lost devices via a computer network. The instructions can include instructions to receive, from a first agent executing on a first device, a first device type. The instructions can include instructions to receive, from a second agent executing on a second device, a second device type, the second device type different from the first device type. The instructions can include instructions to receive, from a user interface, a first group associated with the first device and a second group associated with the second device, the second group different from the first group. The instructions can include instructions to determine that the first device is lost. The instructions can include instructions to determine that the second device is lost. The instructions can include instructions to access, responsive to determining that at least one of the first device and second device is lost, a database storing a first configuration class associated with the first device and a second configuration class associated with the second device. The instructions can include instructions to create, based on the first device type and the first configuration class, a first device-dependent class. The instructions can include instructions to create, based on the second device type and the second configuration class, a second device-dependent class. The instructions can include instructions to meld, based on the first group, the first device-dependent class into a first melded profile. The instructions can include instructions to meld, based on the second group, the second device-dependent class into a second melded profile. The instructions can include instructions to apply the first melded profile to the first device that is lost and the second melded profile to the second device that is lost.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 7A is an illustrative block diagram of an embodiment of a profile for a device.

Like reference numbers and designations in the various drawings indicate like elements.

DETAILED DESCRIPTION

Figure 1:
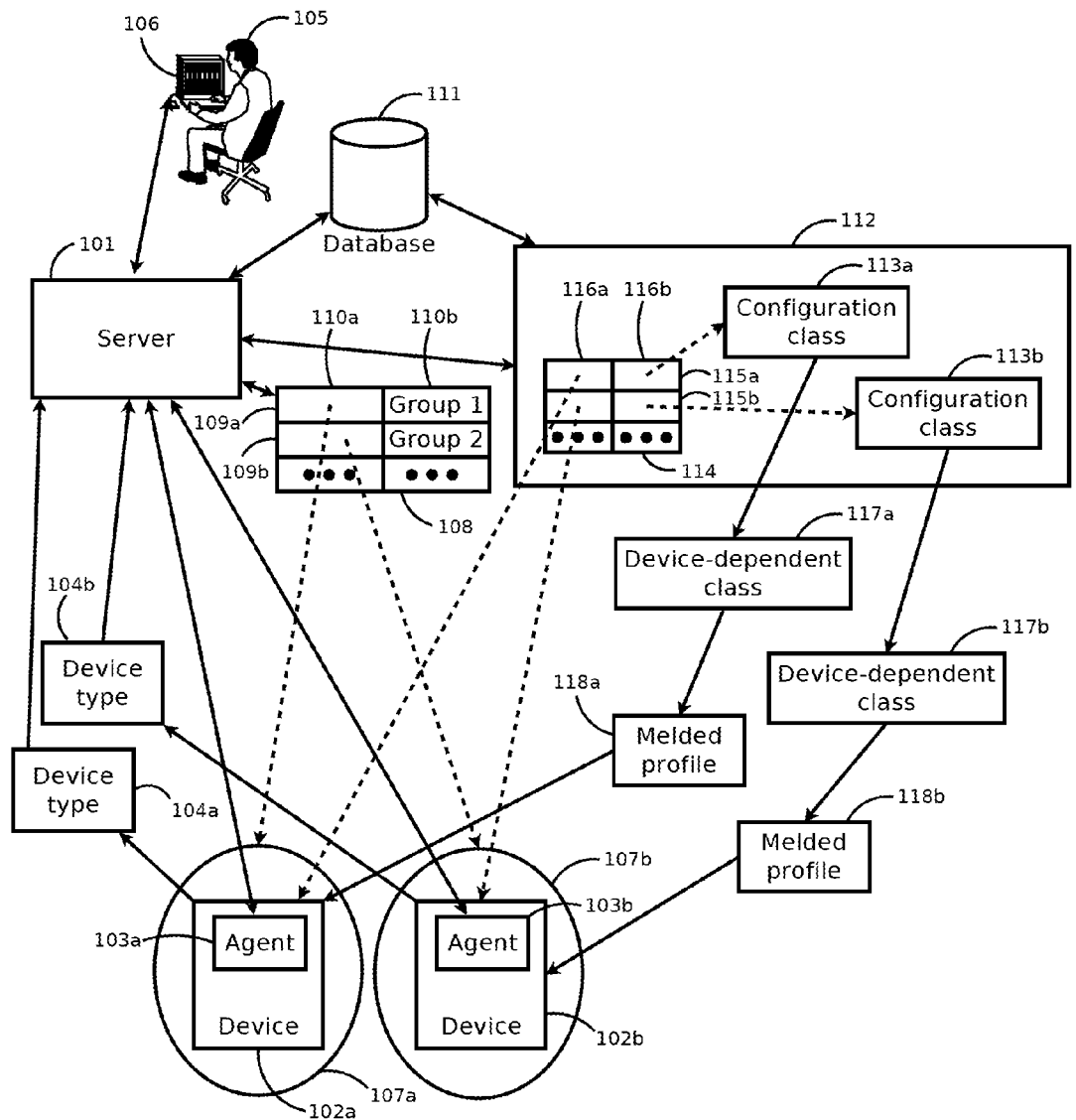
FIG. 1 is an illustrative block diagram of an embodiment of a system to manage lost devices of multiple types with multiple policies using melded profiles associated with groups.

Systems and methods of the present disclosure can facilitate managing one or more devices having at least one device type. Devices can be organized into logical groups that may facilitate applying management configuration information to them, without undue concern for the hardware and software details of the devices. Configuration classes can be developed to represent the management configuration, and these configuration classes can be collected into profiles that are appropriate for the desired management functions. The management functions can be prioritized by profile. The groups can then be used to apply a set of relevant profiles to the proper devices. Without manual effort, a device-specific profile can be created for each device, using the profiles and their associated priorities, and then the device-specific profiles can be applied to the devices. The configuration classes can include management of lost or stolen devices, and can also include management of the cellular data usage of a device.

In an illustrative example, a managed service provider (MSP) is tasked with managing the cellular phones of a company. The sales staff may lose their phones because they travel often and are distracted by customers. Their phones may have large amounts of confidential contact information. The engineering staff may lose their phones because they use them for testing and may leave them in a test setup. However, their phones may not leave the premises, can have little confidential information on them, and may have difficult-to-reproduce test setups. In this case, it may be desirable to quickly erase a lost phone of a sales staff, since the contact information can be restored, but it may be desirable only to lock a lost phone of an engineer, since it is likely to be found and its setup may be lost otherwise.

The MSP can utilize the systems and methods of the present disclosure to define a group for the sales staff and a group for the engineers, without regard to the operating system of the devices (for example, the devices may be predominantly IOS, by APPLE COMPUTER of Cupertino, Calif., and ANDROID, by GOOGLE INC. of Mountain View, Calif.). The MSP can then define a configuration class to erase the device, and another configuration class to lock the device. The MSP can place these configuration classes in profiles along with any other configurations that may be used for the devices of sales staff and engineering. The MSP can associate the profile that includes the configuration class for erasing the device with the group for sales staff, and select it as an action to take for a lost device. The MSP can associate the profile that includes the configuration class for locking the device with the group for engineers, and select it as an action to take for a lost device.

Once this setup is complete, when any device is lost, the MSP can mark the device as lost and the appropriate action will be taken. The correct profile can be selected based on the membership of the device in its group, a device-dependent melded profile can be created based on the profile and the device type, and the melded profile can be applied to the device with the correct result.

In another example, systems and methods of the present disclosure can manage a lost device by melding one or more device-dependent classes into a melded profile, and applying that melded profile to the lost device. A configuration class, in some embodiments, can refer to configuration information for a management function, such as the configuration settings used to set up electronic mail for an engineer, the configuration settings used to set up a time entry application for a service personnel, the configuration settings used to return a device to its factory default state, the configuration settings to sound an audible alarm on the device, or the configuration settings used to lock a device to prevent further use. The configuration class can apply to multiple different device types, such as mobile telecommunications devices running different operating systems and desktop computers. A device-dependent class, in some embodiments, can also refer to the configuration relative to a management function. However, the device-dependent class can be tailored for a configuration of a type of device. Further, the device-dependent class can be customized or tailored using information retrieved, identified, or otherwise obtained from the device. The device-dependent class can be created from a configuration class using executable code.

The system can meld one or more device-dependent classes to create a melded profile. The melded profile includes the configuration information and is ready to be applied to a device. The melded profile can include a combination of multiple device-dependent classes (which may be created from configuration classes). The system can resolve conflicts that may arise when combining multiple device-dependent classes by using explicit priorities of classes, combining classes into a single list, or selecting a class with an algorithm (e.g., smallest, greatest, sum, etc.). The system can use groups to select the device-dependent classes that are to be included in the melded profile. Further, the system can use the groups that are associated with the device to make a selection of corresponding classes.

Turning to the drawings, FIG. 1 is an illustrative block diagram of an embodiment of a system to manage lost devices of multiple types with multiple policies using melded profiles associated with groups. Agents 103a-b can run on computing devices 102a-b and may send device types 104a-b of the computing devices 102a-b to a server 101. The device type 104a can be different from the device type 104b. A user 105 may use a user interface on a computing device 106 to define a table 108 of groups 107a-b on the server 101. The table 108 can have a row 109a-b for each group 107a-b, and each row 109a-b can have a column 110b defining the group 107a-b and a column 110a defining the association of the computing devices 102a-b to the groups 107a-b. In the embodiment depicted in FIG. 1, device 102a is associated with group 107a and device 102b is associated with group 107b. The server 101 may determine that the computing devices 102a-b are lost. The server 101 can access a database 111 to store in memory 112 configuration classes 113a-b and a table 114 that can associate configuration classes 113a-b with computing devices 102a-b. The table 114 can have a row 115a-b for each configuration class 113a-b. Each row 115a-b can have a column 116b with a reference to a configuration class 113a-b and a column 116a defining the relationship of the configuration class 113a-b to a computing device 102a-b. In the embodiment depicted in FIG. 1, the configuration class 113a is associated with computing device 102a, and the configuration class 113b is associated with computing device 102b. The server 101 can create device-dependent classes 117a-b based on the device types 104a-b and the configuration classes 113a-b. The server 101 can meld the device-dependent classes 117a-b into melded profiles 118a-b based on the groups 107a-b. The server 101 can apply the melded profiles 118a-b to the computing devices 102a-b.

The one or more servers 101 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The server 101, computing devices 102a-b, computing device 106, database 111, and memory 112 may communicate using a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as a server 101, computing devices 102a-b, agents 103a-b, computing device 106, database 111, and memory 112, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 101, computing devices 102a-b, agents 103a-b, computing device 106, database 111, and memory 112, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multiprocessing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
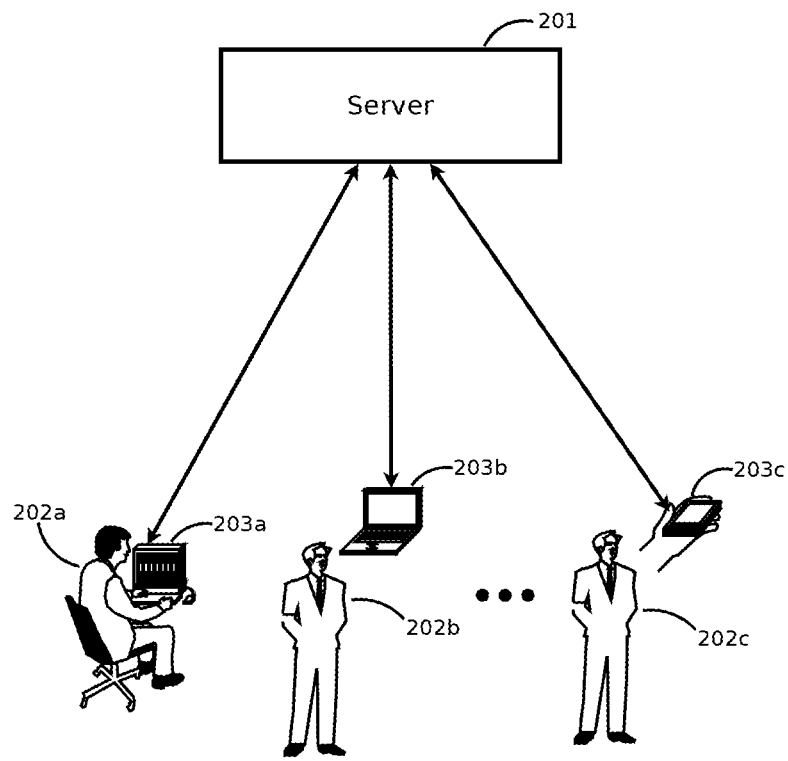
FIG. 2 is an illustrative block diagram of an embodiment of a system to manage multiple device types.

FIG. 2 is an illustrative block diagram of an embodiment of a system to manage multiple device types. Devices 203a-c may be used by end users 202a-c. Devices 203a-c can connect to the server 201 to retrieve and apply management configuration and commands, which can thereby provide management functions for the devices 203a-c. The end users 202a-c may benefit directly from these management functions. For example, the end users 202a-c may enjoy improved performance and fixes of issues on their devices 203a-c without any excessive investment of their own time. Server 201 can support the management of multiple device types. In the embodiment depicted in FIG. 2, multiple device types are illustrated with device 203a as a desktop computer, device 203b as a laptop computer, and device 203c as a mobile phone.

In some embodiments, the server 201 in FIG. 2 can include components or functionality of the server 101 as described with respect to FIG. 1. In some embodiments, the users 202a-c in FIG. 2 can include components or functionality of the user 105 as described with respect to FIG. 1. In some embodiments, the computing devices 203a-c in FIG. 2 can include components or functionality of the computing device 106 as described with respect to FIG. 1.

Figure 3:
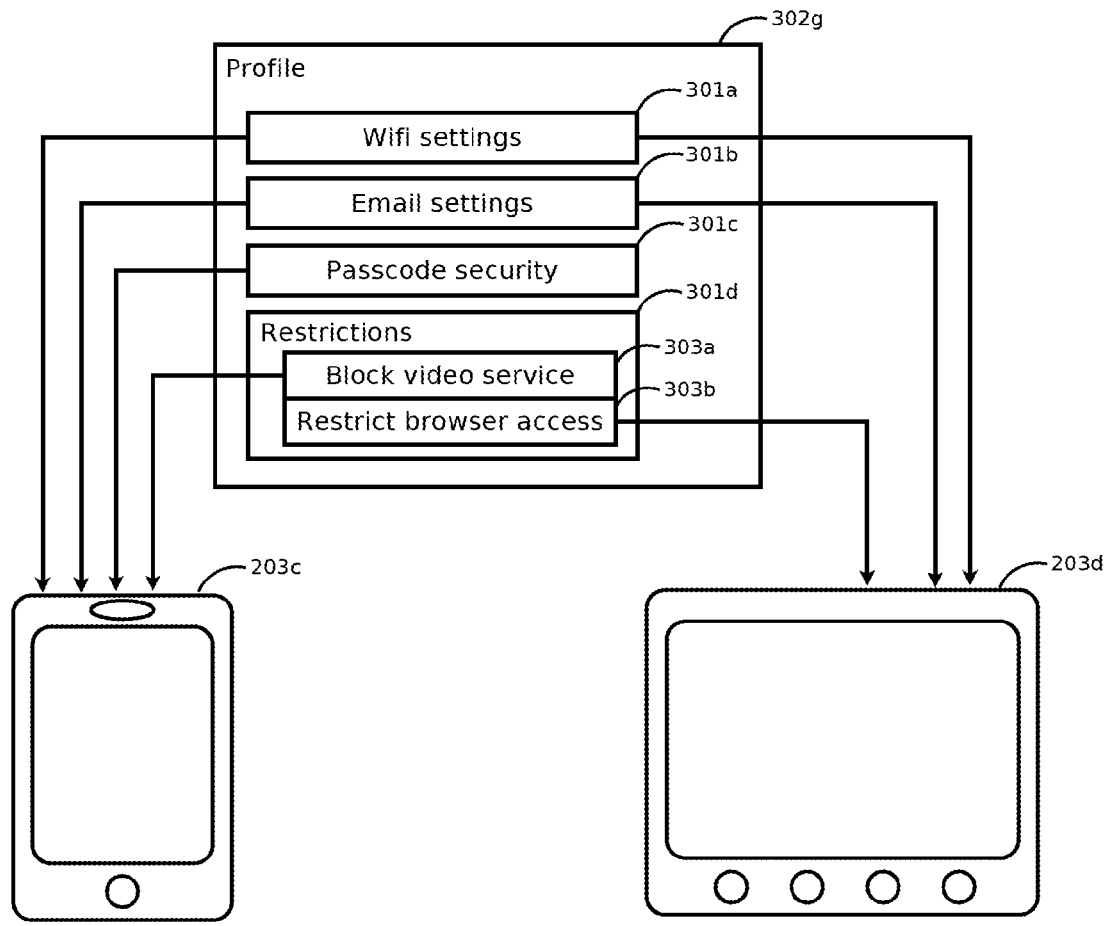
FIG. 3 is an illustrative block diagram of an embodiment of control information use to manage multiple device types.

FIG. 3 is an illustrative block diagram of an embodiment of control information use to manage multiple device types. In the embodiment depicted in FIG. 3, device 203c is a mobile phone and device 203d is a mobile tablet. Devices 203c-d can have configuration classes 301a-d that control their operation. Configuration classes 301a-d may be collected into a profile 302g. Configuration classes 301a-d may comprise configuration options 303a-b. Some configuration classes 301a-d or configuration options 303a-b may not apply to all devices 203c-d. In the embodiment depicted in FIG. 3, configuration classes 301a and 301b apply to both device 203c and device 203d, configuration class 301c only applies to device 203c, and configuration class 301d includes configuration option 303a, which only applies to device 203c, and configuration option 303b, which only applies to device 203d. In the embodiment depicted in FIG. 3, configuration class 301a is a wifi settings configuration class that describes the access and authentication information for a wireless connection, which applies to both devices 203c and 203d. In the embodiment depicted in FIG. 3, configuration class 301b is an email settings configuration class that describes the access and authentication information for an email account, which applies to both devices 203c and 203d. In the embodiment depicted in FIG. 3, configuration class 301c is a passcode security configuration class that describes the password that is used to unlock the device 203c, and the criteria that the password must meet, which applies only to device 203c. In the embodiment depicted in FIG. 3, configuration class 301d is a restrictions configuration class that includes configuration option 303a, which is a restriction to block access to a specific video distribution service that only applies to device 203c, and includes configuration option 303b, which is a browser configuration that restricts access to certain browser functions that only applies to device 203d.

It should be understood that in the embodiment depicted in FIG. 3, the two devices 203c and 203d, along with the specific configuration classes and configuration options for the two devices 203c and 203d, are meant to be illustrative and not limiting.

In some embodiments, the configuration classes 301a-d in FIG. 3 can include components or functionality of the configuration classes 113a-b as described with respect to FIG. 1.

Figure 4A:
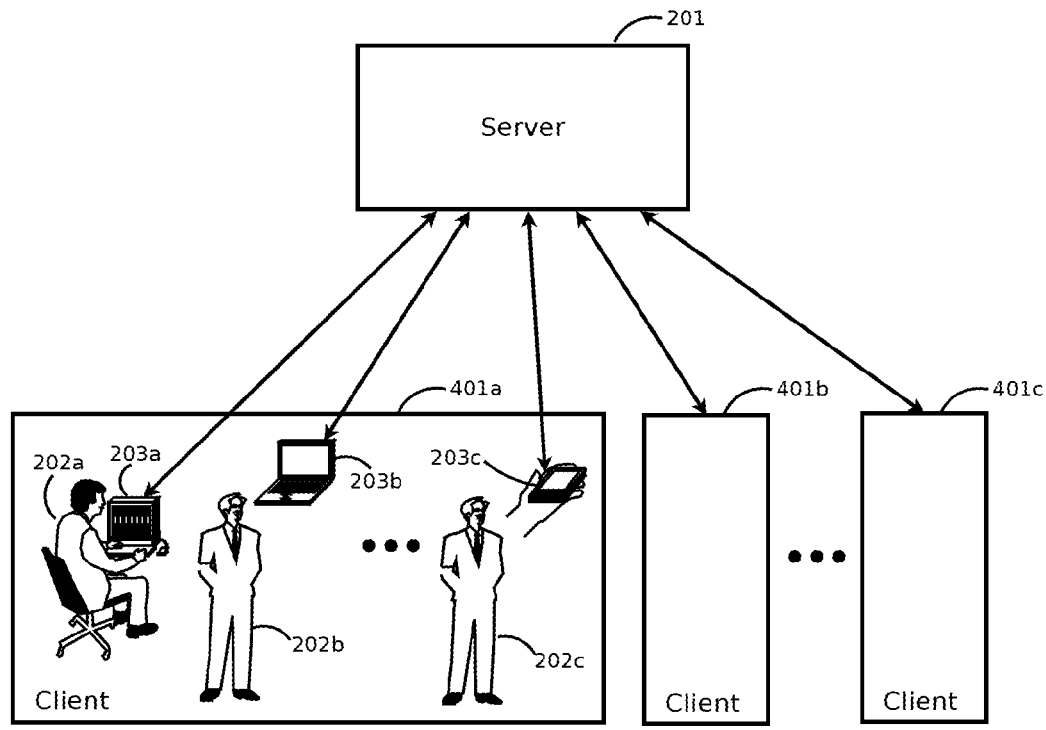
FIG. 4A is an illustrative block diagram of an embodiment of multiple clients having devices under management.

FIG. 4A is an illustrative block diagram of an embodiment of multiple clients having devices under management. A client 401a-c can have one or more devices 203a-c. In the embodiment depicted in FIG. 4A, client 401a has devices 203a-c, which are used by end users 202a-c. This structure can be similar at all clients 401a-c.

Figure 4B:
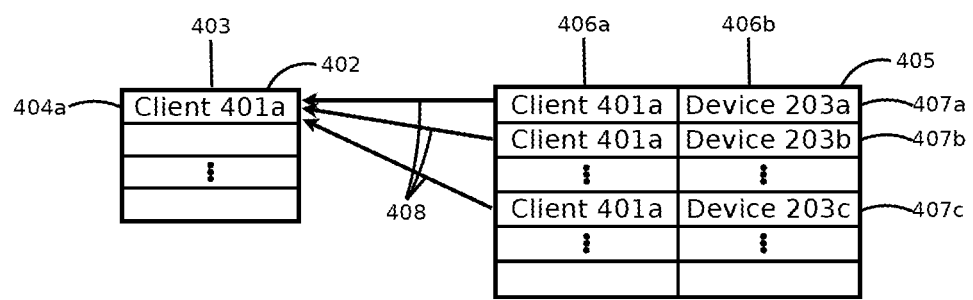
FIG. 4B is an illustrative block diagram of an embodiment of the organization of data used to keep track of the partitioning of devices by client.

FIG. 4B is an illustrative block diagram of an embodiment of the organization of data used to keep track of the partitioning of devices by client. A row 404a of table 402 can represent one client, with one column 403 that references clients. A row 407a-c of table 405 can represent a single device 203a-c, with a column 406b that references the device 203a-c, and another column 406a that references the client 401a where the device 203a-c is located. The embodiment depicted in FIG. 4B illustrates the same organization that is depicted with respect to FIG. 4A. Client 401a is in row 404a of table 402. Devices 203a-c are in rows 407a-c in table 405. Column 406a has a reference to client 401a in rows 407a-c because all of devices 203a-c are in client 401a. A client 401a can have multiple devices 203a-c, as illustrated by the many-to-one relationship 408 from table 405 to table 402.

Figure 5A:
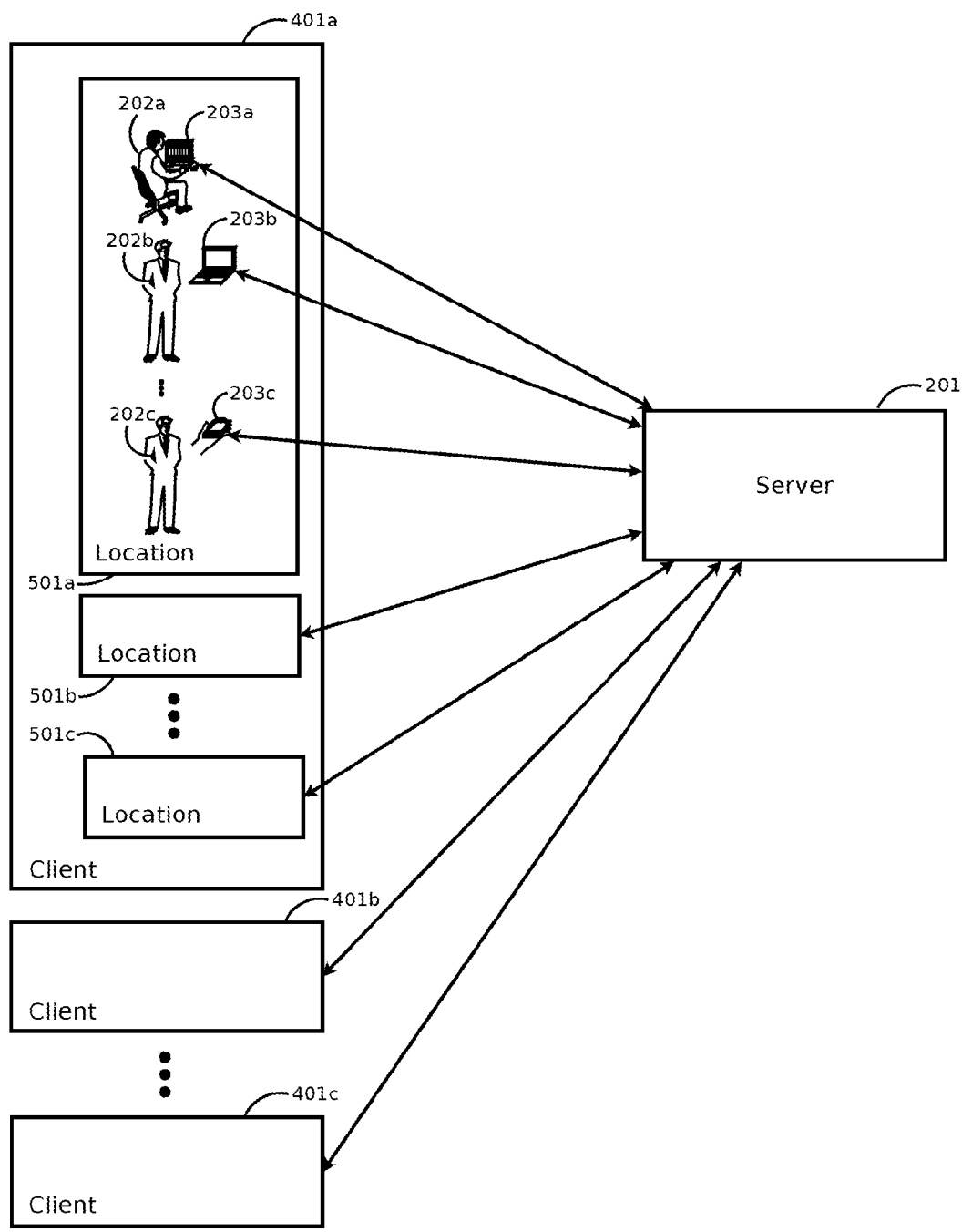
FIG. 5A is an illustrative block diagram of an embodiment of multiple locations having devices under management.

FIG. 5A is an illustrative block diagram of an embodiment of multiple locations having devices under management. The clients 401a-c can be internally organized into one or more locations. In the embodiment depicted in FIG. 5A, client 401a comprises locations 501a-c. A location can have one or more devices 203a-c. In the embodiment depicted in FIG. 5A, location 501a comprises devices 203a-c. The devices 203a-c can comprise different device types. In the embodiment of FIG. 5A, device 203a is a desktop computer, device 203b is a laptop computer, and device 203c is a mobile phone. A device 203a-c may be used by an end user 202a-c who may benefit directly from the management of the device 203a-c by the server 201. The organization of location 501a can be similar to the organization of other locations 501b-c, and the organization of locations 501b-c at client 401a can be similar to the organization of the locations at other clients 401b-c. The server 201 may help visualize the organization of devices 203a-c by clients 401a-c and locations 501a-c. The server 201 may facilitate the management of locations 501a-c one at a time, or the management of all locations 501a-c of a single client 401a. The server 201 may facilitate the management of the devices 203a-c of a large client 401a, by helping to consolidate the management of all the locations 501a-c within that client 401a. Additionally, the server 201 may facilitate the management of multiple clients 401a-c, by helping to consolidate the management of all the clients 401a-c.

Clients 401a-c and locations 501a-c can be used to represent more than one underlying organization. By way of example, one logical organization can be to use clients 401a-c to represent different companies, and to use locations 501a-c to represent different offices within a single company.

Figure 5B:
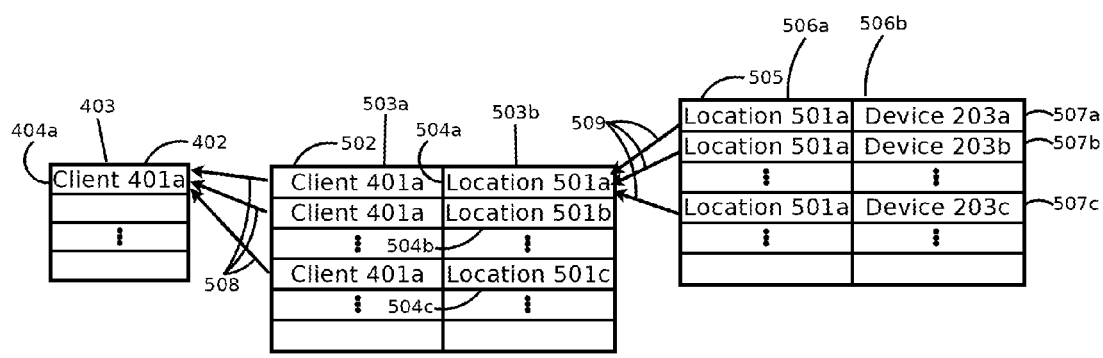
FIG. 5B is an illustrative block diagram of an embodiment of the organization of data used to keep track of the partitioning of devices by client and location.

FIG. 5B is an illustrative block diagram of an embodiment of the organization of data used to keep track of the partitioning of devices by client and location. A row 404a of table 402 can represent a single client 401a, with one column 403 that can reference clients 401a. A row 504a-c of table 502 can represent a single location 501a-c, with one column 503b that references the location 501a-c and another column 503a that references the client 401a that includes the location 501a-c. The embodiment depicted in FIG. 5B illustrates the same organization that is depicted with respect to FIG. 5A. Client 401a is in row 404a in table 402. Locations 501a-c are in rows 504a-c in table 502. Column 503a has a reference to client 401a in rows 504a-c because all of locations 501a-c are in client 401a. A client 401a can have multiple locations 501a-c, as illustrated by the many-to-one relationship 508 from table 502 to table 402.

A row 507a-c of table 505 can represent a single device 203a-c, with one column 506b that references the device 203a-c and another column 506a that references the location 501a where the device 203a-c is located. The embodiment depicted in FIG. 5B illustrates the same organization that is depicted with respect to FIG. 5A. Location 501a is in row 504a in table 502. Devices 203a-c are in rows 507a-c in table 505. Column 506a has a reference to location 501a in rows 507a-c because all of the devices 203a-c are at location 501a. A location 501a can have multiple devices 203a-c, as illustrated by the many-to-one relationship 509 from table 505 to table 502.

Figure 6A:
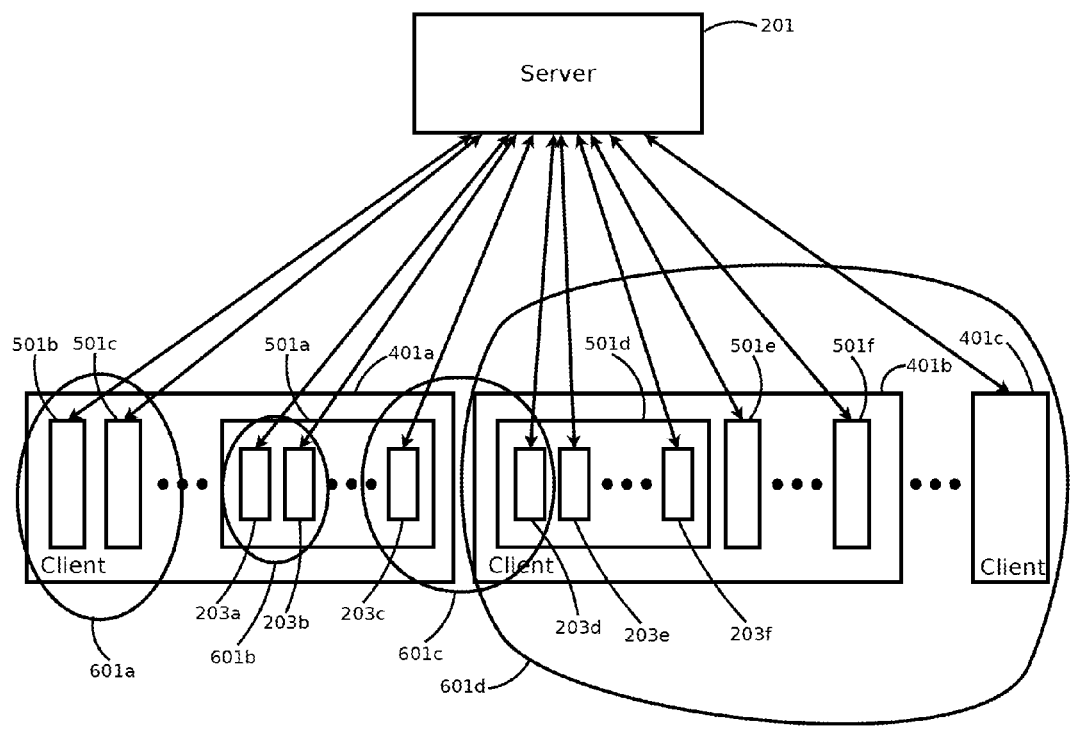
FIG. 6A is an illustrative block diagram of an embodiment of multiple groups having devices under management.

FIG. 6A is an illustrative block diagram of an embodiment of multiple groups having devices under management. A client 401a-c can have one or more locations 501a-f. In the embodiment depicted in FIG. 6A, client 401a includes locations 501a-c, and client 401b includes locations 501d-f. A location 501a-f can have one or more devices 203a-f. In the embodiment depicted in FIG. 6A, location 501a includes devices 203a-c, and location 501d includes devices 203d-f.

Groups 601a-d can be defined as any arbitrary set of one or more devices 203a-f. In the embodiment depicted in FIG. 6A, group 601a includes all of the devices (not pictured) in locations 501b and 501c. Group 601b includes devices 203a and 203b. Group 601c includes devices 203c and 203d. Group 601d includes all of the devices (203d-f and some not pictured) in clients 401b and 401c. Note that these examples are not intended to be limiting, but are instead used to illustrate the concept of groups 601a-d.

The utility of groups 601a-d can arise from the way in which they are defined and used. The server 201 can manage devices 203a-f based on the groups 601a-d to which they belong. What follows are examples of how groups 601a-d can be defined and used in meaningful ways that may be very useful. Note that these examples are not intended to be limiting, but are instead used to illustrate the utility of groups 601a-d.

In one embodiment, a group such as 601a can represent a situation where locations 501b and 501c represent departments in a single office, and location 501a represents a department in another office. In this embodiment, group 601a can be used to manage an entire office as a unit.

In one embodiment, a group such as 601b can represent a situation where devices 203a-b may be used for testing, so the update policy for those devices 203a-b may be managed differently from other devices 203c-f, in order to not to disrupt the testing process. In this embodiment, group 601b can be used to manage the update policy for those devices 203a-b differently.

Group 601c can include devices 203c-d from more than one location. In one embodiment, a group such as 601c can represent a situation where devices 203c-d are ANDROID smart phones, and group 601c can be used to manage devices 203c-d in ways that are specific to ANDROID smart phones.

In one embodiment, a group such as 601d can represent a situation where customers can pay for a higher class of service, such as the customers at clients 401b and 401c. Group 601d can then be used to manage the devices (203d-f and some not pictured) that are covered by the higher class of service.

In some embodiments, the groups 601a-d in FIG. 6A can include components or functionality of the groups 107a-b as described with respect to FIG. 1.

Figure 6B:
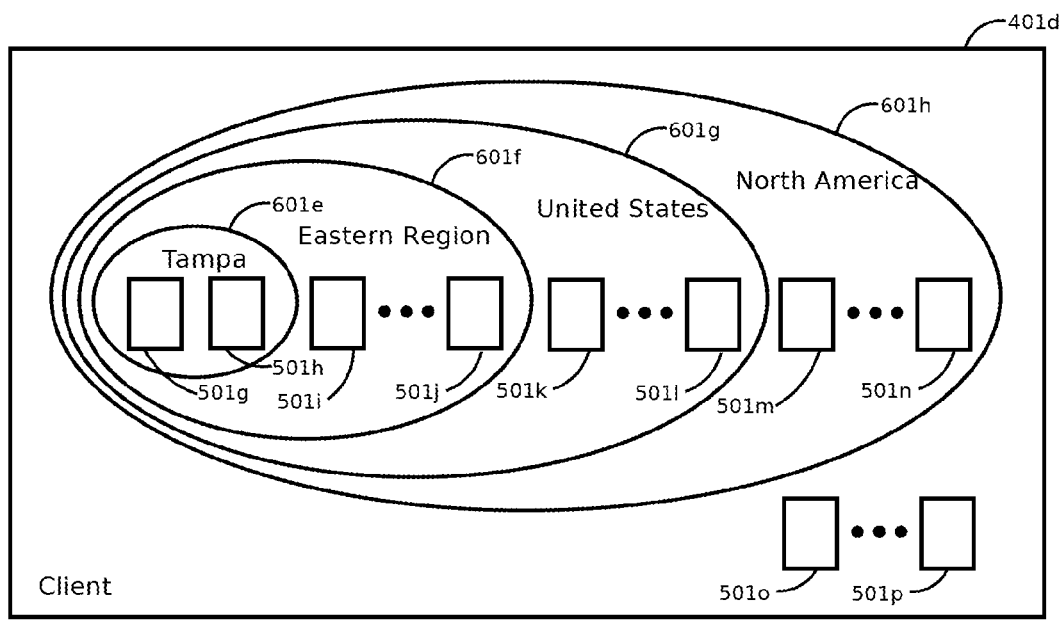
FIG. 6B is an illustrative block diagram of an embodiment of hierarchies of groups.

FIG. 6B is an illustrative block diagram of an embodiment of hierarchies of groups. In the embodiment depicted in FIG. 6B, groups 601e-h can be in a large multi-national company. The two locations 501g and 501h can represent two offices in the city of Tampa. Group 601e can comprise the devices (not pictured) at locations 501g and 501h, which can represent the devices in the city of Tampa. Group 601f can comprise the devices (not pictured) at locations 501g-j, which can represent the devices in the Eastern Region, and can include group 601e as a subset. Group 601g can comprise the devices (not pictured) at locations 501g-l, which can represent the devices in the United States, and can include group 601f as a subset. Group 601h can comprise the devices (not pictured) at locations 501g-n, which can represent the devices in North America, and can include group 601g as a subset. The entire company can be represented by client 401d, which can comprise the devices (not pictured) at locations 501g-p, and can include group 601h as a subset. In this example, the structure of the company can be explicitly represented using groups 601e-h, which can make it possible to display the structure in a hierarchical display. This organization of groups 601e-h may facilitate management, reporting, and billing.

Figure 6C:
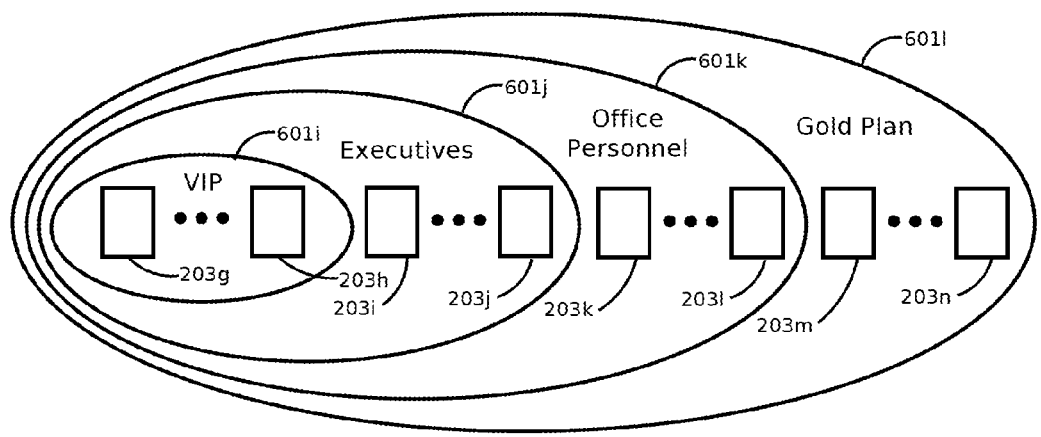
FIG. 6C is an illustrative block diagram of an embodiment of hierarchies of groups that are not organized geographically.

FIG. 6C is an illustrative block diagram of an embodiment of hierarchies of groups that are not organized geographically. The embodiment depicted in FIG. 6C illustrates an organization of groups 601-l that is not done with the geographical organization depicted in the embodiment of FIG. 6B. In the embodiment depicted in FIG. 6C, group 601l can include devices 203g-n that are part of the "Gold Plan", which may indicate a higher level of service for devices 203g-n in exchange for a higher fee to service the devices 203g-n, and may include group 601k as a subset. Group 601k can include devices 203g-l that are used by office personnel and can be serviced in a way that is appropriate to office use. In one embodiment, devices 203g-l in group 601k can run backup and maintenance procedures later than other devices 203m-n, since devices 203g-l may typically be in use by office personnel for a longer workday. Group 601k may include group 601j as a subset. Group 601j can include devices 203g-j that are used by executives within the company and can be serviced in a way that is appropriate to executives. In one embodiment, devices 203g-j may be set up with more stringent security measures to protect sensitive company secrets that may be on devices 203g-j. Group 601j may include group 601i as a subset. Group 601i can include devices 203g-h that are used by the VIP or most senior level management of the company and can be serviced specially for that senior management. In one embodiment, devices 203g-h may generate a special alert upon detecting a support situation, which may then prompt an immediate telephone response by the support staff.

Figure 6D:
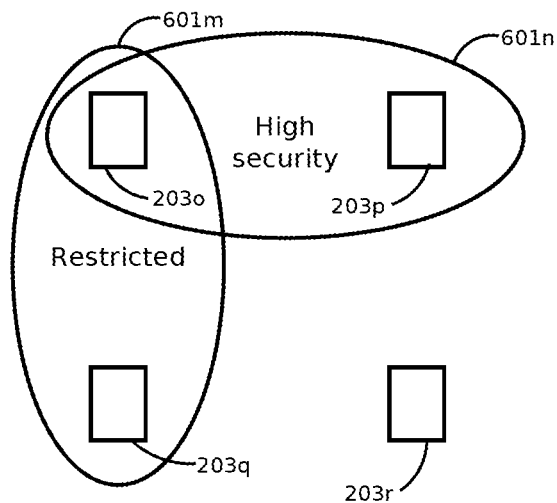
FIG. 6D is an illustrative block diagram of an embodiment of groups that are not hierarchical.

FIG. 6D is an illustrative block diagram of an embodiment of groups that are not hierarchical. The embodiment depicted in FIG. 6A illustrated non-hierarchical groups 601a-d. It should be understood that hierarchical groups 601e-h such as those depicted in the embodiment in FIG. 6B can be used together with non-hierarchical groups 601a-d such as those depicted in the embodiment in FIG. 6A. The embodiment in FIG. 6D depicts four devices 203o-r and two groups 601m-n. Group 601n can include devices such as 203o-p that are managed with high security options. In one embodiment, the devices 203o-p in group 601n may be required to have strong passwords. Group 601m can include devices such as 203o and 203q that are managed with restrictions on the end users. In one embodiment, the devices 203o and 203q in group 601m may not be able to run a browser. In the embodiment depicted in FIG. 6D, the groups 601m and 601n are non-hierarchical, and in fact, they can define four classes of devices 203o-r. Device 203o is in both group 601n and group 601m, so device 203o can be managed with high security and restrictions. Device 203p is in group 601n but not in group 601m, so device 203p can be managed with high security but without restrictions. Device 203q is not in group 601n but is in group 601m, so device 203q can be managed without high security but with restrictions. Device 203r is in neither group 601n nor group 601m, so device 203r can be managed without either high security or restrictions. As will be illustrated in FIG. 7B, groups 601m-n can be associated with profiles (not pictured), and profiles can be combined into melded profiles (not pictured), so the four classes of devices defined by groups 601m and 601n can have four different melded profiles.

Figure 6E:
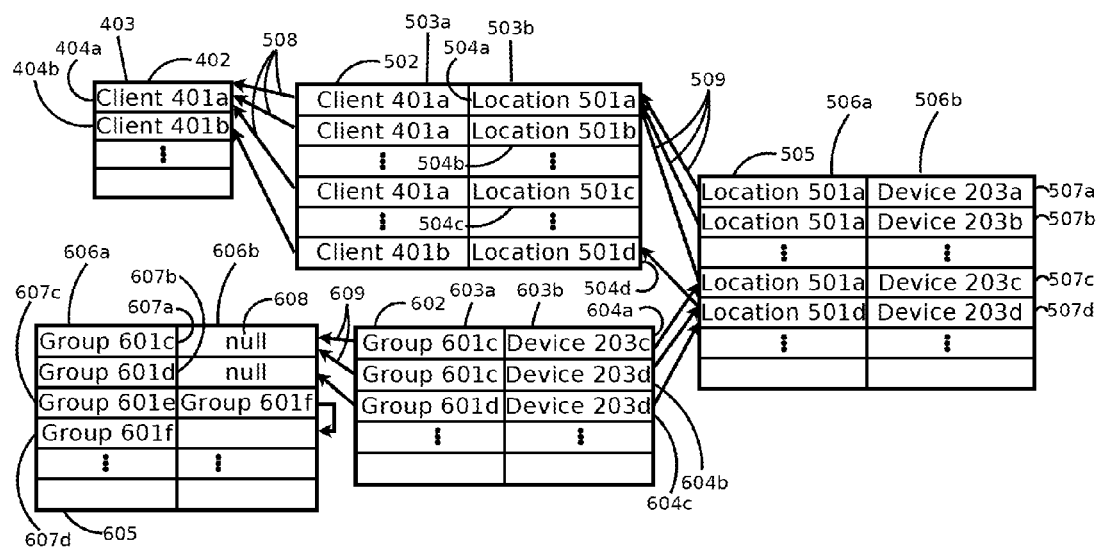
FIG. 6E is an illustrative block diagram of an embodiment of the organization of data used to keep track of the structure and content of groups.

FIG. 6E is an illustrative block diagram of an embodiment of the organization of data used to keep track of the structure and content of groups. The embodiment depicted in FIG. 6E illustrates the same organization that is depicted in the embodiments of FIG. 6A-B. It should be understood that FIG. 6E does not illustrate the data organization for every client 401a-d, location 501a-p, and group 601a-h illustrated in the embodiments depicted in FIG. 6A-B. Instead, FIG. 6E is intended to illustrate certain aspects of an embodiment of the organization of the data representing the clients 401a-b, locations 501a-d, and groups 601c-f as depicted in the embodiments in FIG. 6A-B.

A row 404a-b of table 402 can represent a single client 401a-b, with one column 403 that can reference clients 401a-b. A row 504a-d of table 502 can represent a single location 501a-d, with one column 503b that can reference the location 501a-d and another column 503a that references the client 401a-b that includes the location 501a-d. Client 401a can be in row 404a and client 401b can be in row 404b in table 402. Locations 501a-d can be in rows 504a-d in table 502. Column 503a can have a reference to client 401a in rows 504a-c because locations 501a-c can be in client 401a. Column 503a can have a reference to client 401b in row 504d because location 501d can be in client 401b. A client 401a can include multiple locations 501a-c, as illustrated by the many-to-one relationship 508 from table 502 to table 402.

A row of table 505 can represent a single device 203a-d, with one column 506b that can reference the device 203a-d and another column 506a that can reference the location 501a-d where the device 203a-d is located. Location 501a can be in row 504a and location 501d can be in row 504d in table 502. Devices 203a-d can be in rows 507a-d in table 505. Column 506a can have a reference to location 501a in rows 507a-c because devices 203a-c can be at location 501a. Column 506a can have a reference to location 501d in row 507d because device 203d can be at location 501d. A location 501a can have multiple devices 203a-c, as illustrated by the many-to-one relationship 509 from table 505 to table 502.

Tables 602 and 605 can represent the structure and content of groups 601c-f. A row 607a-d of table 605 can represent a single group 601c-f, with one column 606a that can reference the group 601c-f and another column 606b that can reference the parent group 601c-f. For a group 601e-f that is in a hierarchy, column 606b can refer to the group 601f that is one level up in the hierarchy. The row 607c for group 601e, which can represent the Tampa group 601e as depicted in the embodiment in FIG. 6B, can have a reference in column 606b to the row 607d for group 601f, which can represent the Eastern Region group 601f as depicted in the embodiment in FIG. 6B, because group 601f can be the parent of group 601e in the hierarchy. A group such as 601f that may be at the top level of the hierarchy, or such as 601c-d that may not be in any hierarchy can have a special "null" value 608 in column 606b, which can indicate that it has no parent group 601c-f. Since group 601c may have no parent group 601c-f, row 607a of table 605 can reference group 601c in column 606a and can have a "null" value 608 in column 606b. Since group 601d may have no parent group 601c-f, row 607b of table 605 can reference group 601d in column 606a and can have a "null" value 608 in column 606b.

A row 604a-c of table 602 can represent the membership of a device 203c-d in a group 601c-d, with one column 603b that can reference the device 203c-d and another column 603a that can reference the group 601c-d. A single device 203d can be in more than one group 601c-d by appearing in column 603b of more than one row 604b-c of table 602. Device 203d can be in both group 601c and group 601d, so row 604b of table 602 can reference device 203d in column 603b and can reference group 601c in column 603a, and row 604c of table 602 can reference device 203d in column 603b and can reference group 601d in column 603a. A single group 601c can include more than one device 203c-d, as illustrated by the many-to-one relationship 609 from table 602 to table 605. Device 203c can also be in group 601c, so row 604a of table 602 can reference device 203c in column 603b and can reference group 601c in column 603a.

FIG. 7A is an illustrative block diagram of an embodiment of a profile for a device. The profile 302g can be a collection of configuration classes 301a-d. In the embodiment depicted in FIG. 7A, profile 302g can comprise a wifi settings configuration class 301a, an email settings configuration class 301b, a passcode security configuration class 301c, and a restrictions configuration class 301d. In the embodiment depicted in FIG. 7A, the wifi settings configuration class 301a can comprise configuration details of a service set identification (SSID) 701a, a security type 701b, and a password 701c. A configuration option 303c-e in the wifi settings configuration class 301a can have values for these configuration details 701a-c. In the embodiment depicted in FIG. 7A, the email settings configuration class 301b can comprise configuration details of an account 701d, a server 701e, a type 701f, a username 701g, and a password 701h. A configuration option 303f in the email settings configuration class 301b can have values for these configuration details 701d-h. In the embodiment depicted in FIG. 7A, the passcode security configuration class 301c can comprise configuration details of a setting type 701i and a value 701j. A configuration option 303g-h in the passcode security configuration class 301c can have values for these configuration details 701i-j. The embodiment in FIG. 7A depicts two passcode security configuration options: a configuration option 303g with the actual passcode value, and a configuration option 303h with the minimum length required for any new passcode. In the embodiment depicted in FIG. 7A, the restrictions configuration class 301d can comprise configuration details of a setting type 701k and a value 701l. A configuration option 303a-b in the restrictions configuration class 301d can have values for these configuration details 701k-l. The embodiment in FIG. 7A depicts two restrictions configuration options: a configuration option 303a for blocking a specific video service, and a configuration option 303b for restricting browser access.

It should be understood that in the embodiment depicted in FIG. 7A, the contents and values of the profile 302g are meant to be illustrative and not limiting.

Figure 7B:
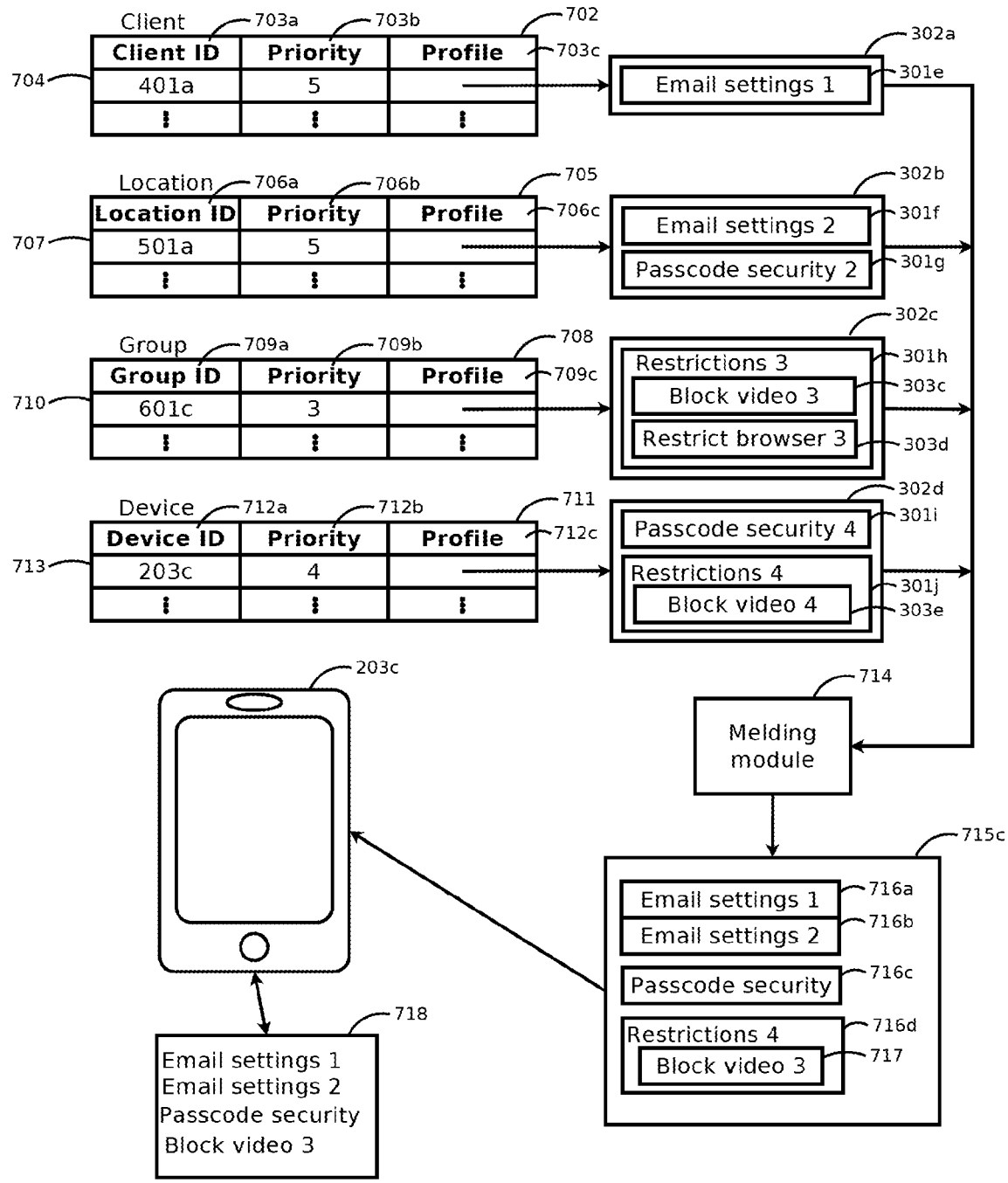
FIG. 7B is an illustrative block diagram of an embodiment of generating a melded profile for a device.

FIG. 7B is an illustrative block diagram of an embodiment of generating a melded profile for a device. The information for controlling one device 203c may originate from more than one profile 302a-d, and the melding module 714 can assemble the information for controlling a device 203c into a melded profile 715c. In the embodiment depicted in FIG. 7B, the melding module 714 can assemble the information from profiles 302a-d into a melded profile 715c, which can then be applied to device 203c, which may in turn cause device 203c to update its local configuration storage 718 to reflect the configuration classes 716a-d in the melded profile 715c.

A table 702 of client profile information can comprise a client identifier 703a, a priority value 703b, and a reference 703c to a profile. In the embodiment depicted in FIG. 7B, row 704 of table 702 can reference client 401a, can indicate a priority of 5, and can reference a profile 302a that can include an email settings configuration class 301e named "Email settings 1". Table 702 can represent profile information that is to be applied to a device 203c based on the client 401a where the device 203c is located.

A table 705 of location profile information can comprise a location identifier 706a, a priority value 706b, and a reference 706c to a profile. In the embodiment depicted in FIG. 7B, row 707 of table 705 can reference location 501a, can indicate a priority of 5, and can reference a profile 302b that can include an email settings configuration class 301f named "Email settings 2" and a passcode security configuration class 301g named "Passcode security 2". Table 705 can represent profile information that can be applied to a device 203c based on the location 501a where the device 203c is located.

A table 708 of group profile information can comprise a group identifier 709a, a priority value 709b, and a reference 709c to a profile. In the embodiment depicted in FIG. 7B, row 710 of table 708 can reference group 601c, can indicate a priority of 3, and can reference a profile 302c that can include a restrictions configuration class 301h with a configuration option 303c for blocking access to a specific video service, named "Block Video 3", and a configuration option 303d for restricting browser access, named "Restrict Browser 3". Table 708 can represent profile information that can be applied to a device 203c based on a group 601c in which the device 203c can be a member. Note that since a device 203a-u can be a member of more than one group 601a-p, as depicted previously in the embodiments in FIGS. 6A-E, table 708 can have more than one row 710 representing profile information that can be applied to a single device 203c.

A table 711 of device profile information can comprise a device identifier 712a, a priority value 712b, and a reference 712c to a profile. In the embodiment depicted in FIG. 7B, row 713 of table 711 can reference device 203c, can indicate a priority of 4, and can reference a profile 302d that can include a passcode security configuration class 301i named "Passcode security 4", and can also include a restrictions configuration class 301j with a configuration option 303e for blocking access to a specific video service, named "Block Video 4". Table 711 can represent profile information that can be applied to device 203c. Table 711 can represent profile information that is specific to a single device 203c.

The melding module 714 can take information from multiple profiles 302a-d and select the correct configuration information to include in a melded profile 715c for a specific device 203c. This selection can be based on, for example, the priority of the configuration information, the type of configuration information, whether or not the information applies to the device 203c, and so on. The embodiment depicted in FIG. 7B illustrates this selection process, and this illustration will now be described in further detail.

The client-based profile 302a can provide an email settings configuration class "Email settings 1" 301e with priority 5, and the location-based profile 302b can provide an email settings configuration class "Email settings 2" 301f with priority 5. Since email settings configuration classes may be able to support multiple configuration settings, the melding module 714 can use both of the email configuration 301e-f classes in the melded profile 715c, as "Email settings 1" 716a and "Email settings 2" 716b.

The location-based profile 302b can provide a passcode security configuration class "Passcode security 2" 301g with priority 5, and the device-based profile 302d provides a passcode security configuration class "Passcode security 4" 301i with priority 4. Some configuration options in a passcode security configuration class 301g, 301i may be restricted to a single value, such as the "Passcode value" 303g as depicted in the embodiment in FIG. 7A. In this case, the melding module 714 may be required to choose one configuration option, and in the embodiment depicted in FIG. 7B, it may choose the configuration option from "Passcode security 4" 301i since that configuration class has a higher priority as indicated by the lower numerical priority value. Some configuration options in a passcode security class 716c may be computed by using the "most restrictive setting", such as the "Minimum length" 303h as depicted in the embodiment in FIG. 7A. In this case, the melding module 714 may choose the most restrictive configuration option 303h, which, for a minimum password length, is the largest numerical value, and in the embodiment depicted in FIG. 7B, it may choose the largest numerical value of the minimum password length from "Passcode security 2" 301g and "Passcode security 4" 301i for the value of the configuration option "Minimum password length" for the melded configuration class 716c in the melded profile 715c. In this way, the melding module 714 can construct the melded passcode security configuration class 716c from the two passcode security classes 301g and 301i.

The group-based profile 302c can provide a restrictions configuration class 301h with priority 3, including a video blocking configuration setting named "Block video 3" 303c, and the device-based profile 302d provides a restrictions configuration class 301j with priority 4, including a video blocking configuration setting named "Block video 4" 303e. Since the video blocking configuration setting may be allowed to have only one value, the melding module 714 may be required to choose one, and in the embodiment depicted in FIG. 7B, it may choose "Block video 3" 303c since it has a higher priority as indicated by the lower numerical priority value. The melding module 714 may then put the melded "Block video 3" configuration setting 717 into a melded restrictions configuration class 716d in the melded profile 715c.

The group-based profile 302c can provide a restrictions configuration class 301h with priority 3, including a browser restriction configuration option named "Restrict browser 3" 303d. In the embodiment depicted in FIG. 7B, device 203c may not provide support for the browser restriction configuration, and the melding module 714 may not include anything in the melded profile 715c based on "Restrict browser 3" 303d.

The melded profile 715c can be applied to the device 203c. As a result of this application, the device 203c may update its internal configuration storage 718 to include the "Email 1", "Email 2", "Passcode security", and "Block video 3" configuration settings from the melded profile 715c.

It should be understood that in the embodiment depicted in FIG. 7B, the organization of and values in the tables 702, 705, 708, and 711, the profiles 302a-d, the melded profile 715c, the device 203c, and the local configuration storage 718 are meant to be illustrative and not limiting. In addition, it should be understood that the examples of the selection process implemented by the melding module 714 are not intended to be limiting or exhaustive, and are meant to represent an illustration of the melding process.

In some embodiments, the melded profile 715c in FIG. 7B can include components or functionality of the melded profiles 118a-b as described with respect to FIG. 1. In some embodiments, the device-dependent configuration classes 716a-d in FIG. 7B can include components or functionality of the device-dependent configuration classes 117a-b as described with respect to FIG. 1.

Figure 7C:
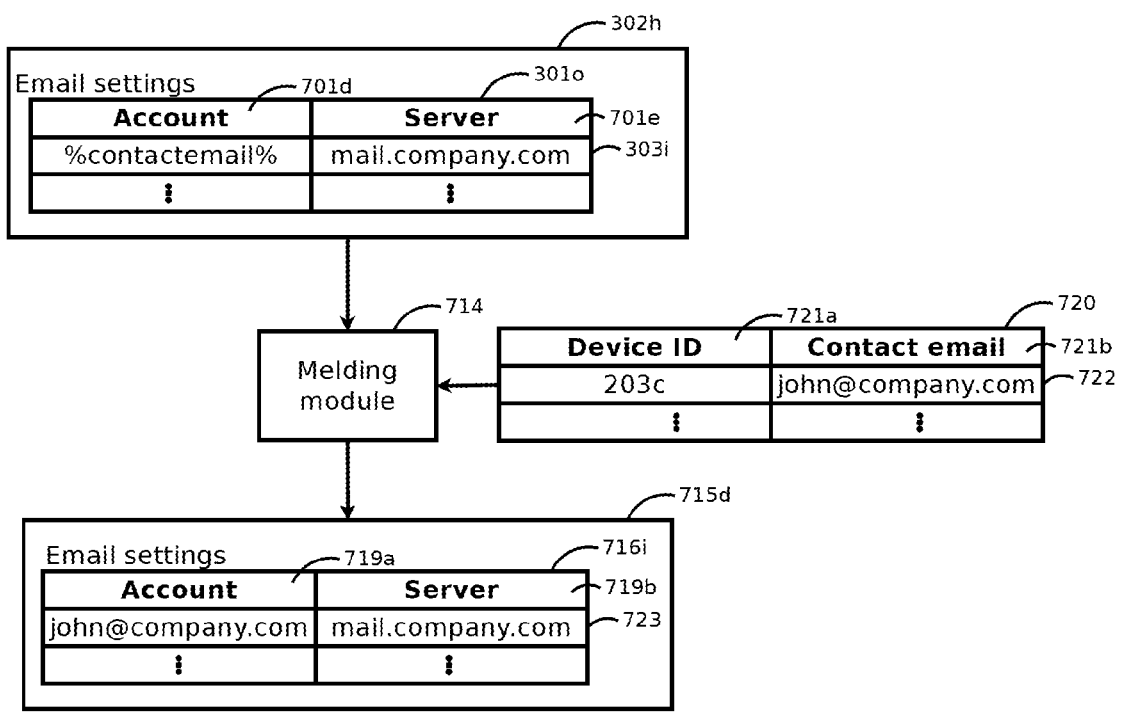
FIG. 7C is an illustrative block diagram of an embodiment of the use of replacement variables in generating a melded profile for a device.

FIG. 7C is an illustrative block diagram of an embodiment of the use of replacement variables in generating a melded profile for a device. When generating the melded profile 715d, the melding module 714 can encounter a configuration setting 303i with a replacement variable, and can substitute the value of the replacement variable for a specific instance. The embodiment in FIG. 7C depicts the use of a device-specific replacement variable. The variable can be defined in a table 720 that can be indexed by a device identifier 721a for the value 721b of the contact email address for that device 203c. In the embodiment depicted in FIG. 7C, row 722 can provide a contact email address 721b of "john@company.com" for device 203c as indicated in the device identifier column 721a. The melding module 714 can process the email settings configuration class 301o, and may encounter a replacement variable for the contact email address in the account column 701d of the configuration setting row 303i, as indicated by the notation "%contactemail%". In generating the corresponding melded email settings configuration class 716i in the melded profile 715d, the melding module 714 can substitute the value of the replacement variable "john@company.com" for the reference to the replacement variable "%contactemail%" in the corresponding row 723 of the account column 719a in the corresponding melded email settings configuration class 716i. This substitution can facilitate customizing the configuration information of individual devices 203a-u with additional information from the server 201.

Although not depicted in FIG. 7C, additional tables similar in function to table 720, or additional columns in table 720, can provide values for additional replacement variables indexed by client identifier, location identifier, group identifier, and so on. These additional tables, or additional columns, can also facilitate customizing a melded profiles 715d for an individual device 203a-u.

Figure 8:
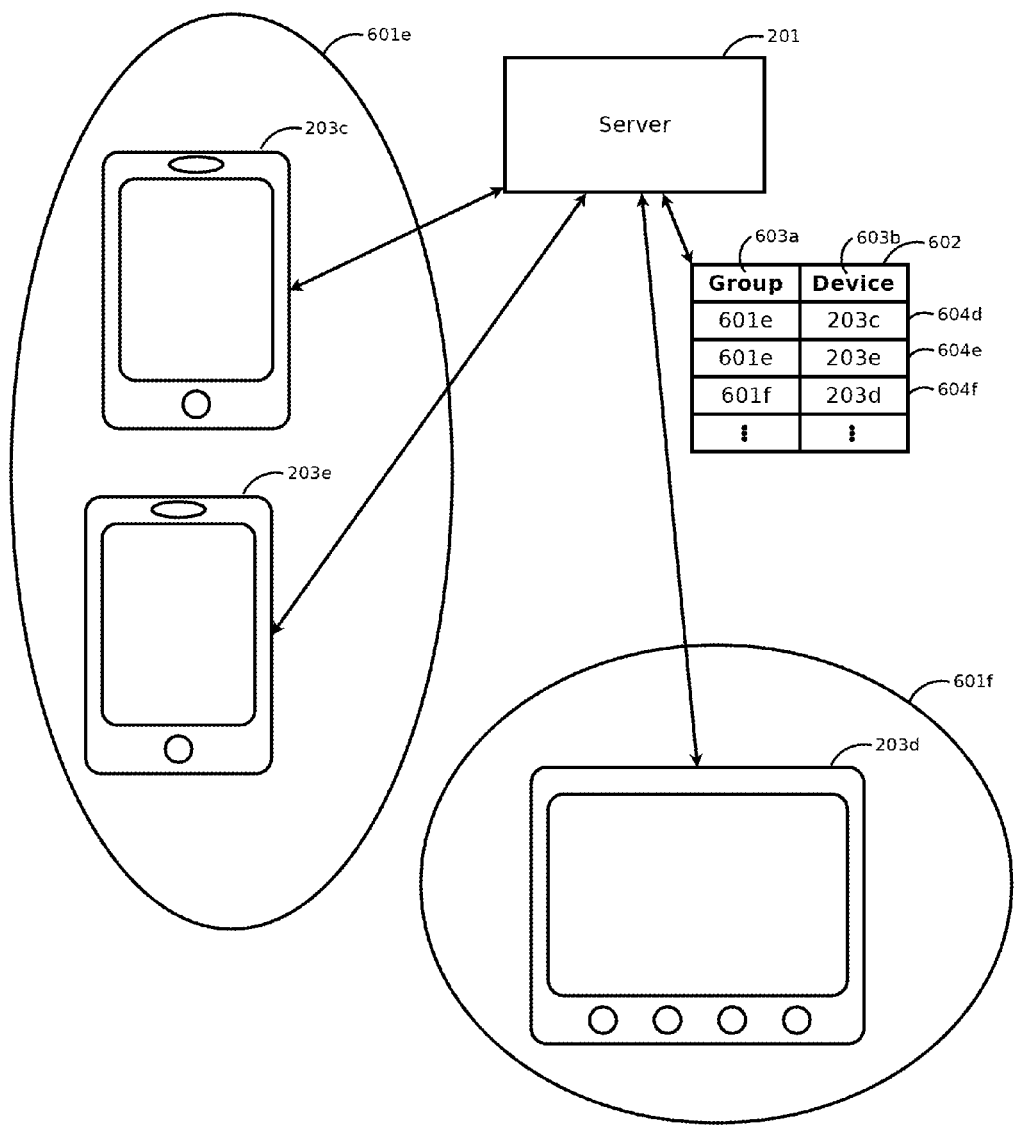
FIG. 8 is an illustrative block diagram of an embodiment of a device automatically joining a group.

FIG. 8 is an illustrative block diagram of an embodiment of a device automatically joining a group. Table 602 can include groups 601e-f that may be based on characteristics of devices 203c-e that may be determined automatically. As a result, the devices 203c-e can be placed into these groups 601e-f without any manual intervention. The embodiment in FIG. 8 depicts a group 601e that can comprise devices 203c, 203e that may be a certain type of mobile phone, and a group 601f that can comprises devices 203d that may be a certain type of mobile tablet. The hardware type of devices 203c-e can be determined automatically. The devices 203c-e can report this hardware type to the server 201, and the server 201 can set up table 602 to assign the devices 203c-e to the appropriate group 601e-f. In the embodiment depicted in FIG. 8, the server 201 can add row 604d to table 602 indicating that device 203c can be in group 601e, the server 201 can add row 604e to table 602 indicating that device 203e can be in group 601e, and the server 201 can add row 604f to table 602 indicating that device 203d can be in group 601f. The groups 601e-f can represent a grouping of the devices 203c-e based on their hardware type, and may facilitate managing the devices 203c-e by applying certain configurations based on special requirements of the hardware types of those devices 203c-e.

It should be understood that in the embodiment depicted by FIG. 8, the organization of and values in table 602, the details of the hardware types of devices 203c-e, and the specifics of groups 601e-f are meant to be illustrative and not limiting.

Figure 9:
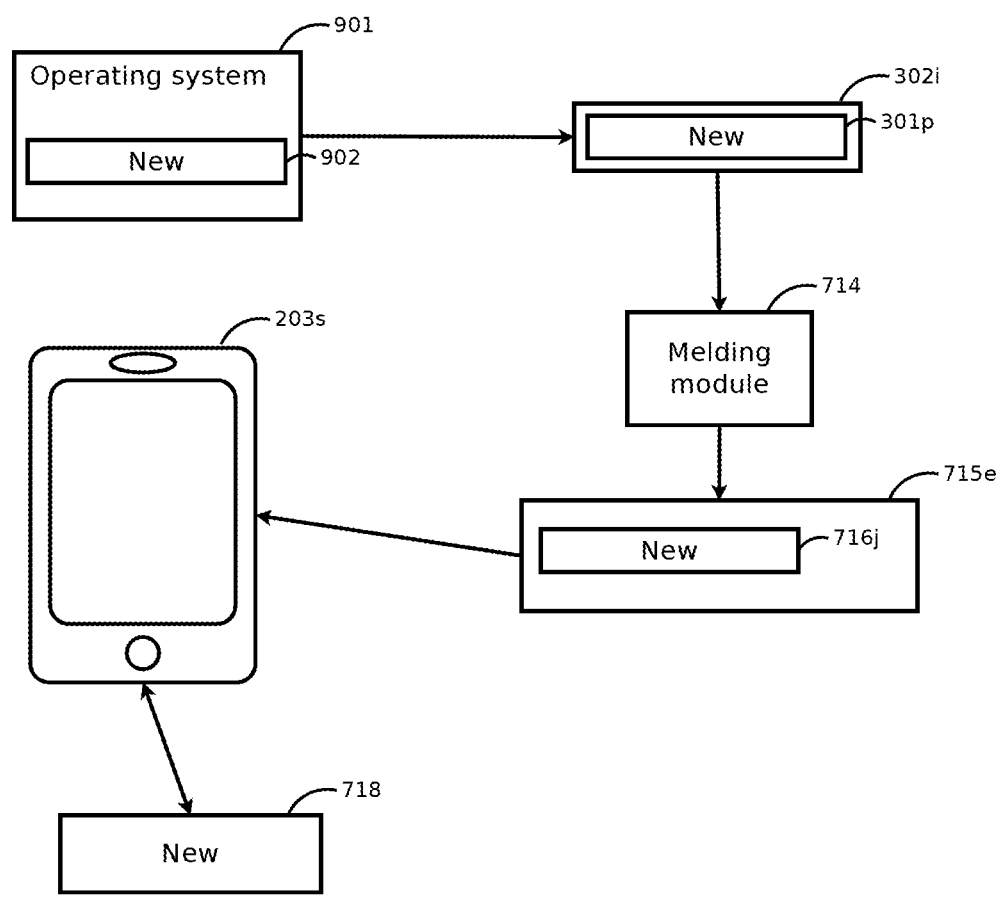
FIG. 9 is an illustrative block diagram of an embodiment of updating a melded profile due to a change in a configuration class.

FIG. 9 is an illustrative block diagram of an embodiment of updating a melded profile due to a change in a configuration class. A configuration class 301p for a device 203s may be added, deleted, or modified. This may be due to changes in the hardware, changes in the software, or other reasons. In the embodiment depicted in FIG. 9, a new configuration class 301p may be added, for example, to support a new feature that may include a new type of configuration 902. The relevant profile 302i can be updated to include the new configuration class 301p. The melding module 714 can create a new melded profile 715e for device 203s, and can include the new configuration class 301p in its selection process to create the melded profile 715e. The melding module 714 may create an appropriate melded configuration class 716j in the melded profile 715e. Since the melded profile 715e may have changed from its last creation, due to the inclusion of the melded configuration class 716j, it may be applied to the device 203s, and the device 203s may update its internal configuration storage 718 to include the new configuration setting from the melded profile 715e.

In another embodiment depicted by FIG. 9, the profile 302i and configuration class 301p may remain the same, but the device 203s may have a new operating system 901 installed. The operating system 901 may support a new configuration 902 that was not previously supported. The melding module 714 can now include the configuration class 301p in its selection process when it is creating a melded profile 715e, because the operating system 901 of the device 203s now supports the configuration class 301p. As a result, the melding module 714 may include an appropriate melded configuration class 716j in the melded profile 715e. Since the melded profile 715e may have changed from its last creation, due to the inclusion of the melded configuration class 716j, it may be applied to the device 203s, and the device 203s may update its internal configuration storage 718 to include the new configuration setting from the melded profile 715e.

Figure 10:
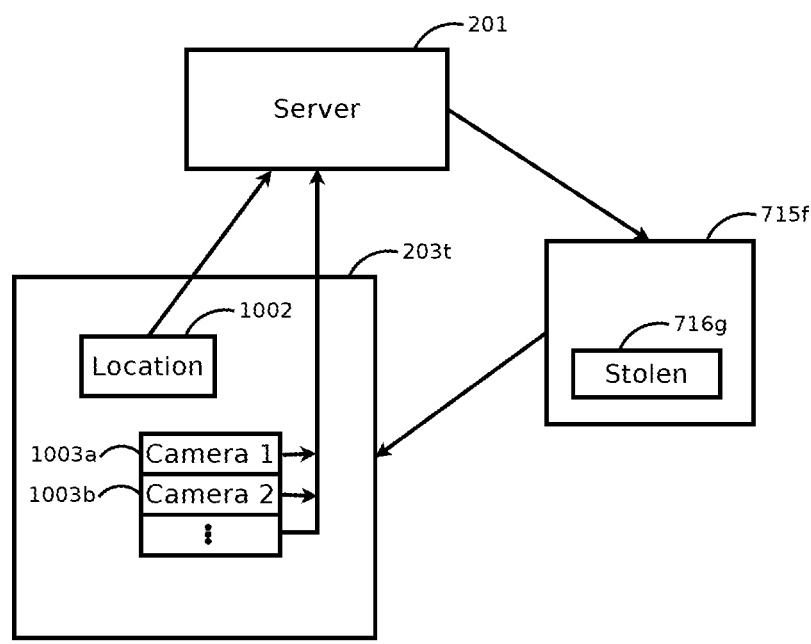
FIG. 10 is an illustrative block diagram of an embodiment of stolen device management.

FIG. 10 is an illustrative block diagram of an embodiment of stolen device management. It may be desirable to facilitate law enforcement officials with the recovery of a device 203t that has been stolen. The device 203t may be reported as missing, and the server 201 can update a configuration class that may result in the melded profile 715f for the device 203t including a melded configuration class 716g indicating that the device 203t may be stolen. The melded configuration class 716g may be applied to the device 203t, and the device 203t may start using built-in location services 1002 to record the location of the device 203t and send it to the server 201. This location information may facilitate law enforcement officials in finding and recovering the stolen device 203t. Additionally, the device 203t may use one or more built-in cameras 1003a-b to record images of the environment of the device 203t, which may include the perpetrator of the theft. The recording of these images may be triggered by the action of unlocking the device 203t, or by activity in the accelerometers or gyroscopes of the device 203t indicating that it is being moved, or by the act of running an application on the device 203t, or by other events, to increase the likelihood of capturing images of the perpetrator of the theft. The device 203t can send these images to the server 201 where they may facilitate law enforcement officials in finding or recovering the stolen device 203t, or they may provide evidence in subsequent prosecution of the theft.

Figure 11:
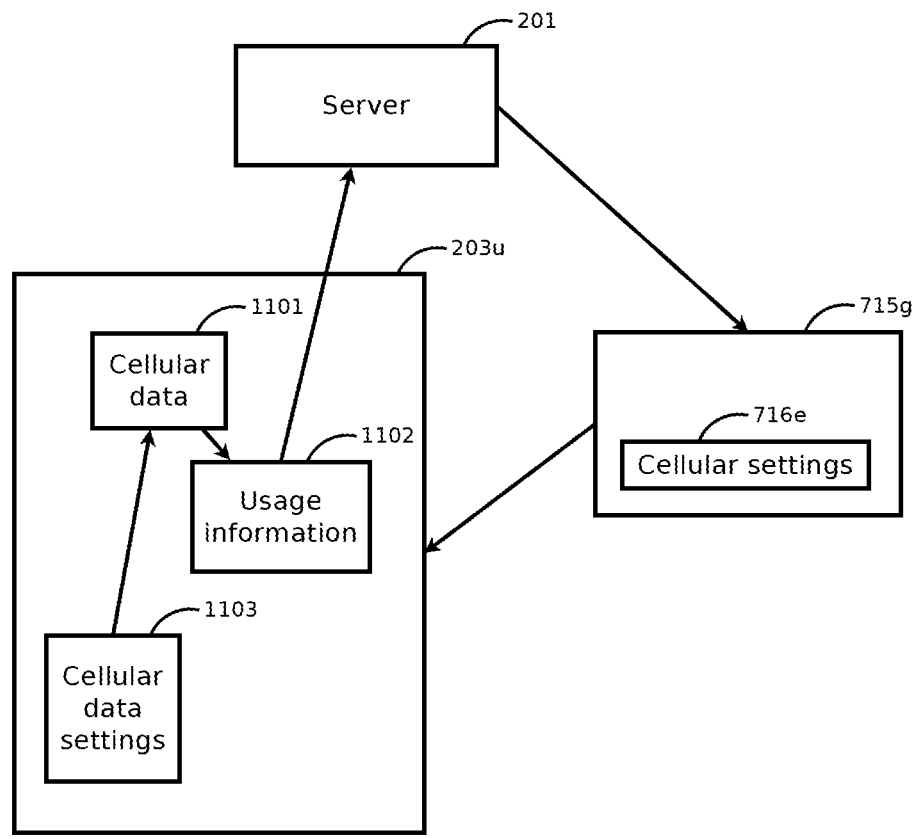
FIG. 11 is an illustrative block diagram of an embodiment of data usage management.

FIG. 11 is an illustrative block diagram of an embodiment of data usage management. The network connectivity of device 203u may be partially or fully implemented using the cellular telephone network through a cellular data module 1101. The costs of the plans for such service may be complex to determine, so it may be difficult to manage those costs without monitoring the usage of the network as it is happening. The device 203u may be able to use information from the cellular data module 1101 to collect usage information 1102 and send it to the server 201. The server 201 may be able to provide functions to manage the cellular data usage on the device 203u, either automatically or with manual intervention. These management functions can be implemented using profiles and configuration classes that ultimately create a melded profile 715g with a melded cellular settings configuration class 716e. The melded profile 715g can be applied to the device 203u, and the melded cellular settings configuration class 716e can change the cellular data settings 1103 on the device 203u, which can result in a change in operation of the cellular data module 1101. In some embodiments, changes in the cellular settings configuration class 716e can be used to enable or disable data roaming, modify the maximum bandwidth allowed, modify the usage allowed based on the weekday or time of day, or other changes that affect the cellular data module 1101.

Figure 12:
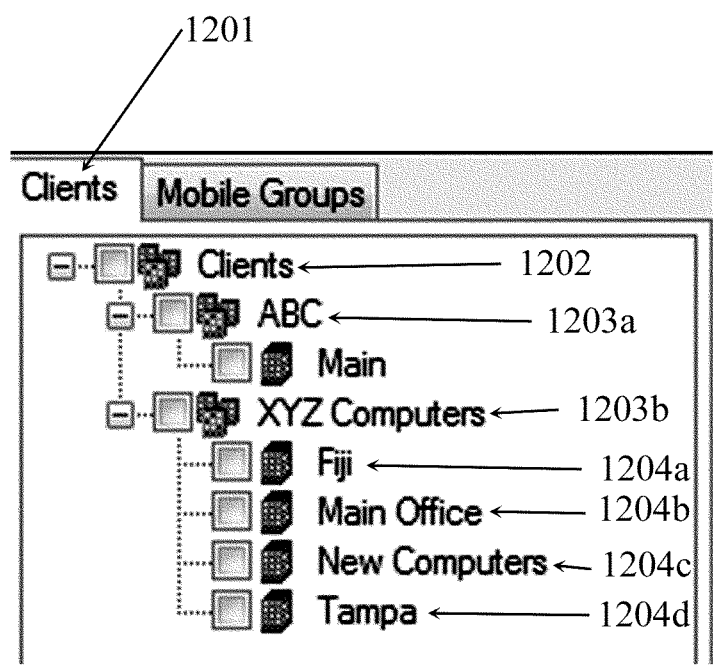
FIG. 12 is an illustrative example of an embodiment of a user interface for displaying and modifying clients and locations.

FIG. 12 is an illustrative example of an embodiment of a user interface for displaying and modifying clients and locations. Tab 1201 can select the clients and locations for display. The clients can be displayed in a hierarchical fashion, where the top level 1202 can represent all the clients, each line 1203a-b indented under the top level 1202 can represent a single client, and each line 1204a-d indented under the line 1203b for a single client can represent a location within that client. Any of the lines 1202, 1203a-b, and 1204a-d can be selected to apply actions to the devices 203a-u represented by the line, modify the entity represented by the line, or take other actions.

Figure 13:
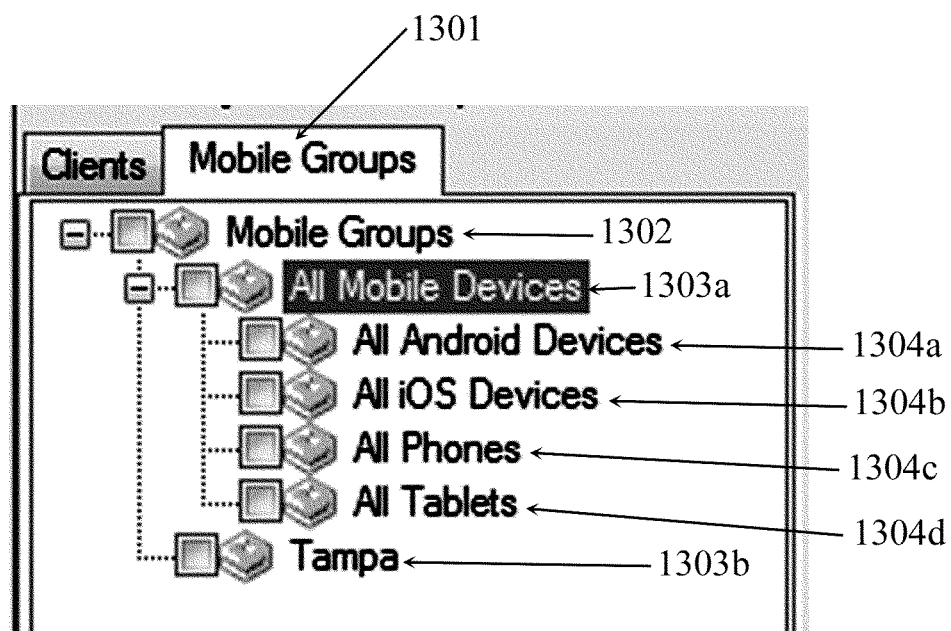
FIG. 13 is an illustrative example of an embodiment of a user interface for displaying and modifying groups.

FIG. 13 is an illustrative example of an embodiment of a user interface for displaying and modifying groups. Tab 1301 can select the groups 601a-p for display. The groups 601a-p can be displayed in a hierarchical fashion that may be representative of the hierarchy of the groups 601a-p. Line 1302 can represent all of the groups 601a-p. In the embodiment depicted in FIG. 13, there are two top-level groups represented by lines 1303a-b. The group represented by line 1303a can have four groups within it, represented by lines 1304a-d. Any of the lines 1302, 1303a-b, and 1304a-d can be selected to apply actions to the devices 203a-u represented by the line, modify the entity represented by the line, or take other actions.

It should be understood that in the example of FIG. 13, the organization and names of the groups represented by lines 1302, 1303a-b, and 1304a-d are meant to be illustrative and not limiting.

Figure 14A:
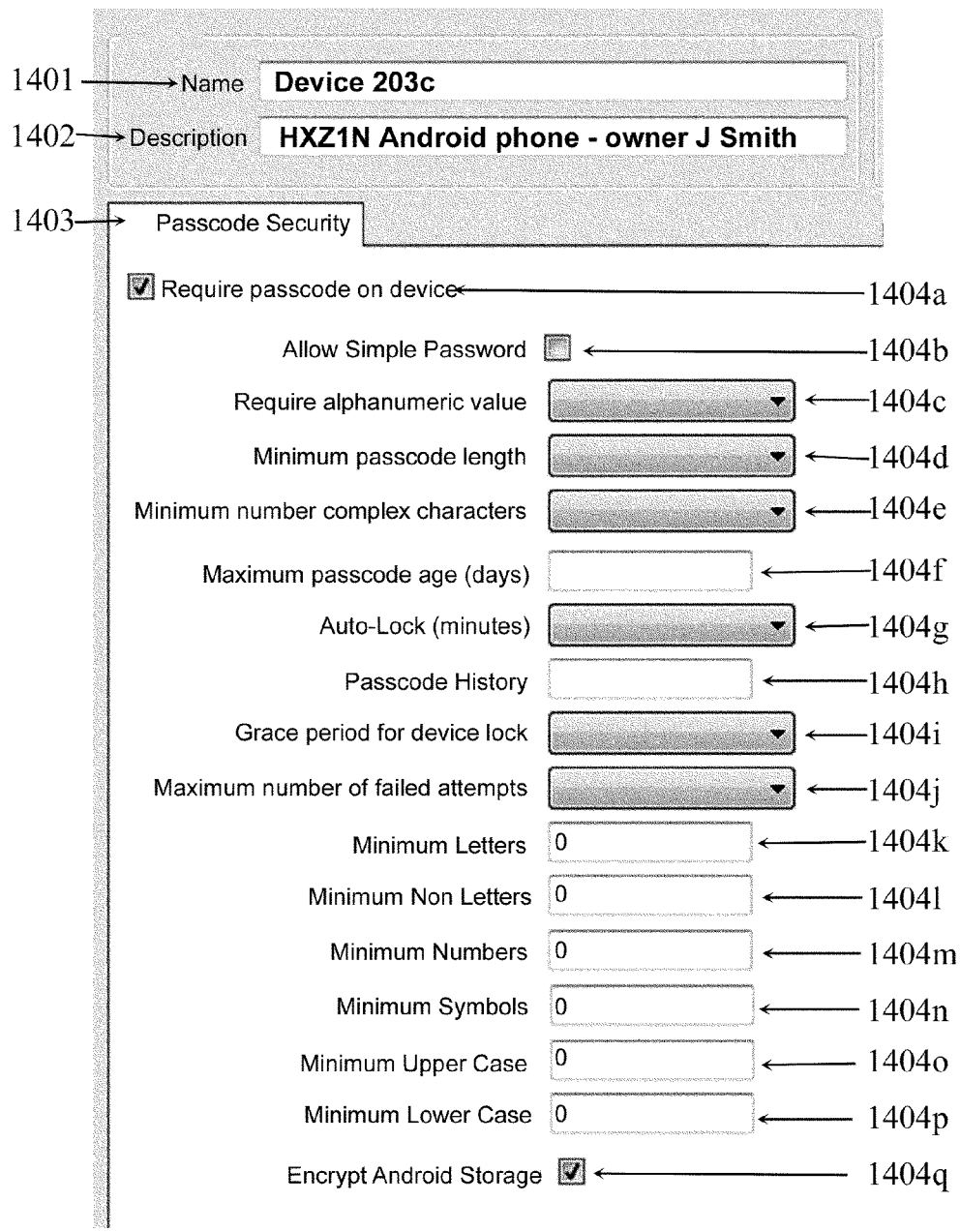
FIG. 14A is an illustrative example of an embodiment of a user interface for displaying and modifying a passcode security configuration class for a single device.

FIG. 14A is an illustrative example of an embodiment of a user interface for displaying and modifying a passcode security configuration class for a single device. Line 1401 can display and allow modification of the name of the device 203c. Line 1402 can display and allow modification of a description of the device 203c. Tab 1403 can select the user interface for a passcode security configuration class. The controls 1404 can display the current settings for the passcode security and enable modifying those settings. Since this user interface is for displaying and modifying a configuration class for a single device 203c, all the settings that can be configured on the device may be available. What follows is a description of the settings depicted in the embodiment in FIG. 14A.

Setting 1404a can be the "Require passcode on device" setting, and can specify whether or not a passcode is required on the device 203c. If setting 1404a is not set, then none of the other settings 1404 may be active. Setting 1404b can be the "Allow Simple Password" setting, and can specify whether or not the passcode can be a simple password, such as "1234". Setting 1404c can be the "Require alphanumeric value" setting, and can specify whether or not the passcode is required to include numbers and/or letters. Setting 1404d can be the "Minimum passcode length" setting, and can specify the minimum number of characters required in the passcode. Setting 1404e can be the "Minimum number complex characters" setting, and can specify the minimum number of complex characters (#,$,%,^) required in the passcode. Setting 1404f can be the "Maximum passcode age (days)" setting, and can specify the number of days before the passcode is expired. Setting 1404g can be the "Auto-Lock (minutes)" setting, and can specify the length of time in minutes that device 203c should be locked after the user last touched the screen. Setting 1404h can be the "Passcode History" setting, and prevents users from reusing the same passcode. For example, if it is set to "2", the user will not be able to use either of the last two passcodes again when creating a new passcode. Setting 1404i can be the "Grace period for device lock" setting, and can specify the time after the device 203c is locked before a password is required. Setting 1404j can be the "Maximum number of failed attempts" setting, and can specify the number of failed attempts allowed while entering the passcode before the device 203c is erased. Setting 1404k can be the "Minimum Letters" setting, and can specify the minimum number of letters required in the passcode. Setting 1404l can be the "Minimum NonLetters" setting, and can specify the minimum number of characters that are not letters (symbols or numbers) required in the passcode. Setting 1404m can be the "Minimum Numbers" setting, and can specify the minimum number of characters that are numbers required in the passcode. Setting 1404n can be the "Minimum Symbols" setting, and can specify the minimum number of symbols (#, $, %, ^) required in the passcode. Setting 1404o can be the "Minimum Upper Case" setting, and can specify the minimum number of letters in the passcode that are required to be uppercase. Setting 1404p can be the "Minimum Lower Case" setting, and can specify the minimum number of letters in the passcode that are required to be lowercase.

Setting 1404*q* can be the "Encrypt Android Storage" setting, and can specify whether or not the storage is required to be encrypted.

Figure 14B:
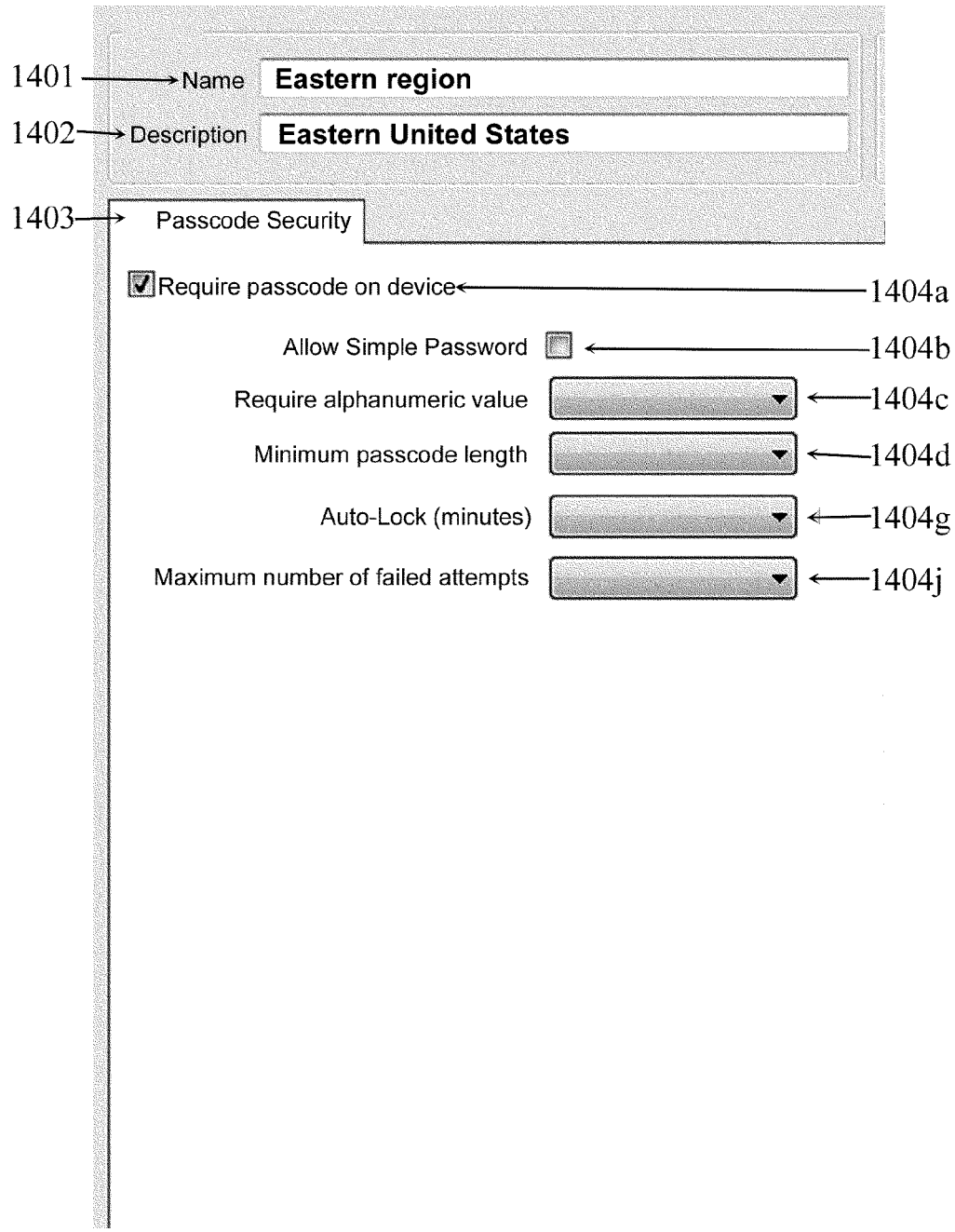
FIG. 14B is an illustrative example of an embodiment of a user interface for displaying and modifying a passcode security configuration class for multiple devices in a group.

FIG. 14B is an illustrative example of an embodiment of a user interface for displaying and modifying a passcode security configuration class for multiple devices in a group. Line 1401 can display and allow modification of the name of the group 601*f*. Line 1402 can display and allow modification of a description of the group 601*f*. Tab 1403 can select the user interface for a passcode security configuration class. The controls 1404*a-j* can display the current settings for the passcode security and enable modifying those settings. Since this user interface is for displaying and modifying a configuration class for a group 601*f*, only the settings that can be configured on all devices in the group 601*f* are available. These settings will not be described in further detail here since they have already been described for the embodiment in FIG. 14A.

It should be understood that in the embodiments depicted in FIG. 14A-B, the names and values of the settings represented by 1404*a-q* are meant to be illustrative and not limiting.

Figure 15:
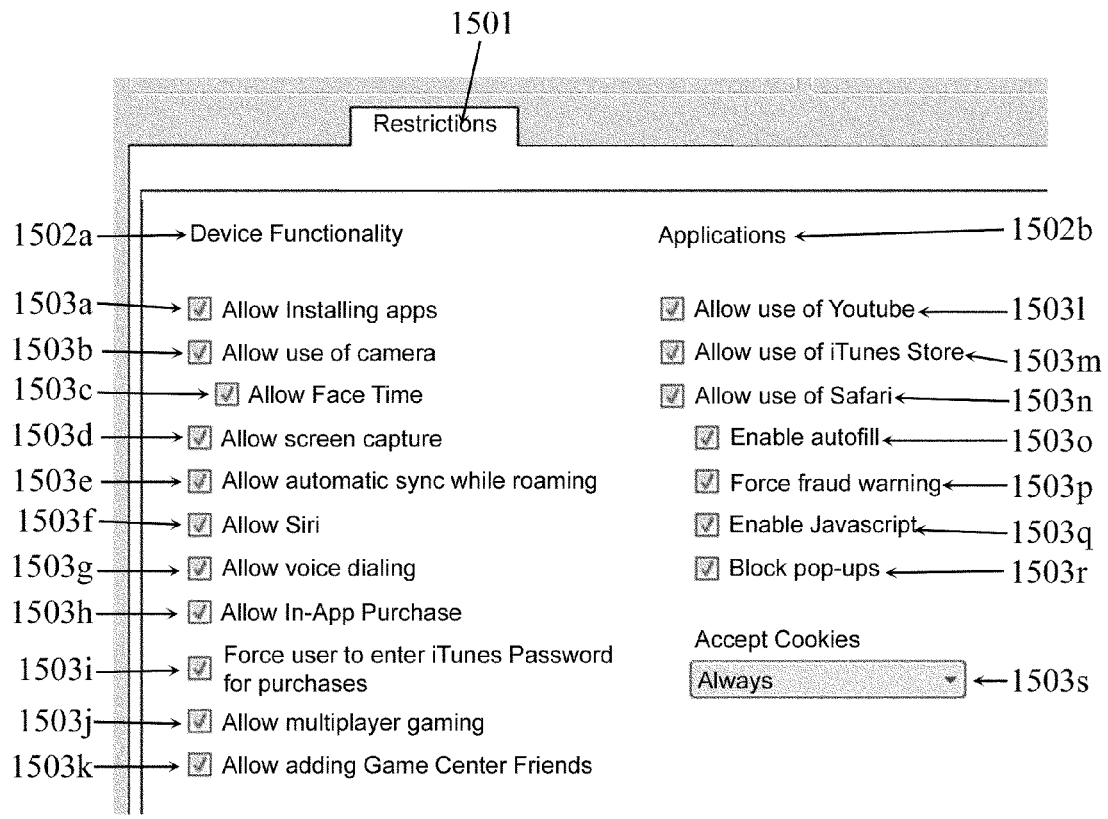
FIG. 15 is an illustrative example of an embodiment of a user interface for displaying and modifying a restrictions configuration class.

FIG. 15 is an illustrative example of an embodiment of a user interface for displaying and modifying a restrictions configuration class. Tab 1501 can select the user interface for a restrictions configuration class. Headers 1502*a-b* can facilitate the understanding of the controls 1503*a-s* by collecting the controls 1503*a-s* into logical sections and labeling those sections. The controls 1503*a-s* can display the current settings for the restrictions and enable modifying those settings. What follows is a description of the settings in the embodiment depicted in FIG. 15.

Header 1502*a* can be for the "Device Functionality" collection of settings and can represent settings that can change how the basic operating system operates and interacts with the end user. Setting 1503*a* can be the "Allow Installing apps" setting, and can specify whether or not the end user is allowed to install and uninstall applications on the device 203*c*. Setting 1503*b* can be the "Allow use of camera" setting, and can specify whether or not the end user is allowed to use the camera on the device 203*c*. Setting 1503*c* can be the "Allow FaceTime" setting, and can specify whether or not the end user is allowed to use a popular video chat application. Setting 1503*d* can be the "Allow screen capture" setting, and can specify whether or not the end user is allowed to record the contents of the device display as an image file. Setting 1503*e* can be the "Allow automatic sync when roaming" setting, and can specify whether or not the end user is allowed to turn on synchronization services while the device 203*c* is roaming. These synchronization services may use cellular data bandwidth, which may be expensive. Setting 1503*f* can be the "Allow Siri" setting, and can specify whether or not the end user is allowed to use a built-in voice-activated "personal assistant" function. Setting 1503*g* can be the "Allow voice dialing" setting, and can specify whether or not the end user is allowed to use a built-in voice-activated telephone dialer function. Setting 1503*h* can be the "Allow In-App Purchase" setting, and can specify whether or not the end user is allowed to make purchases in an online store when offered as a part of the functionality of an application. Setting 1503*i* can be the "Force user to enter iTunes Password for purchases" setting, and can specify whether or not the end user is required to enter a password every time a purchase is made from an online store. Setting 1503*j* can be the "Allow multiplayer gaming" setting, and can specify whether or not the end user is allowed to participate in games that involve interacting with other remote users in real time. Setting 1503*k* can be the "Allow adding Game Center friends" setting, and can specify whether or not the end user is allowed to add new entries to a scoreboard that keeps track of competitive entries on scores that are achieved by playing games on the device 203*c*.

Header 1502*b* can be for the "Applications" collection of settings and can represent settings that can change how the various applications operate and interact with the end user. Setting 1503*l* can be the "Allow use of YouTube" setting, and can specify whether or not the end user is allowed to use a popular video streaming application. Setting 1503*m* can be the "Allow use of iTunes Store" setting, and can specify whether or not the end user is allowed to access an online store for applications and media such as music and books. Setting 1503*n* can be the "Allow use of Safari" setting, and can specify whether or not the end user is allowed to use the browser that is built into the device 203*c*. If setting 1503*n* is disabled, then none of the settings 1503*o-s* may be enabled, because they may not apply. Setting 1503*o* can be the "Enable autofill" setting, and can specify whether or not the browser will try to fill in form entries based on what the end user has entered previously. Setting 1503*p* can be the "Force fraud warning" setting, and can specify whether or not the browser will always display a warning if the site appears to be fraudulent. Setting 1503*q* can be the "Enable Javascript" setting, and can specify whether or not the browser will run Javascript scripts. Setting 1503*r* can be the "Block pop-ups" setting, and can specify whether or not the browser will attempt to block the creation of pop-up displays. Setting 1503*s* can be the "Accept Cookies" setting, and can specify how the browser should treat "cookies", which can be site-specific state information. The options may be to ignore the cookies, accept the cookies, or ask the end user whether or not to accept the cookies.

It should be understood that in the embodiment depicted in FIG. 15, the names of the headers 1502*a-b* and the names and values of the settings represented by 1503*a-s* are meant to be illustrative and not limiting.

Figure 16:
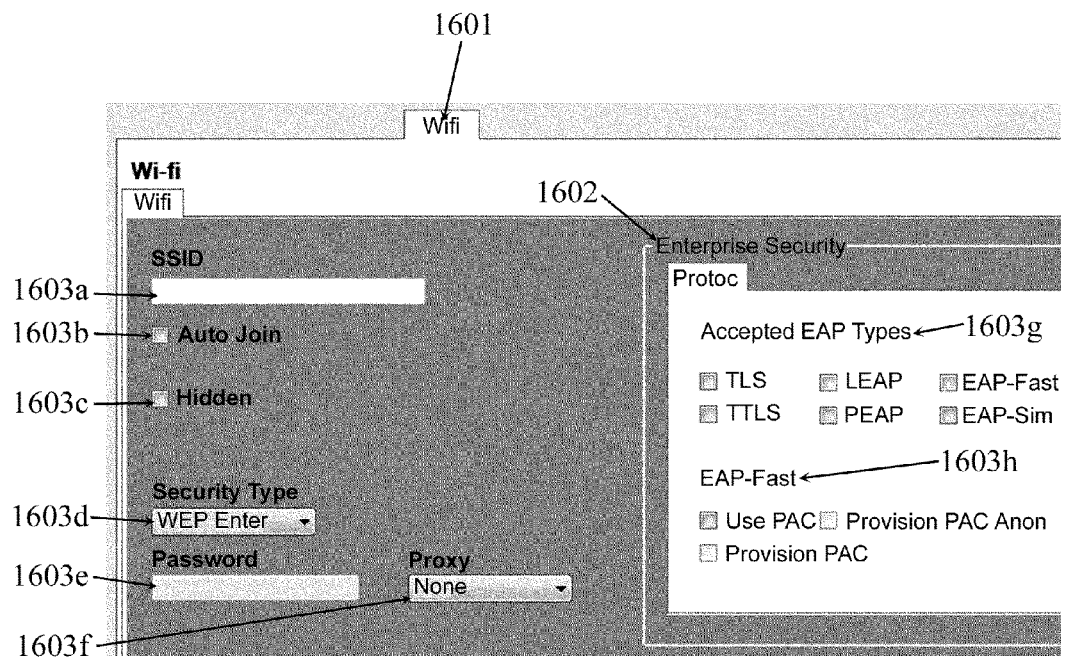
FIG. 16 is an illustrative example of an embodiment of a user interface for displaying and modifying a wifi settings configuration class.

FIG. 16 is an illustrative example of an embodiment of a user interface for displaying and modifying a wifi settings configuration class. Tab 1601 can select the user interface for a wifi settings configuration class. Header 1602 can facilitate the understanding of the controls 1603*a-h* by collecting the controls 1603*a-h* into logical sections and labeling those sections. The controls 1603*a-h* can display the current settings for the wifi configuration and may enable modifying those settings. What follows is a description of the settings in the embodiment depicted in FIG. 16.

Setting 1603*a* can be the "SSID" setting, and can specify the service set identifier (SSID) of the wifi network. Setting 1603*b* can be the "Auto Join" setting, and can specify whether or not the device 203*c* should join the wifi network whenever it is in range. Setting 1603*c* can be the "Hidden" setting, and can specify whether or not the wifi network is not broadcasting its SSID. Setting 1603*d* can be the "Security Type" setting, and can specify what type of security, if any, is required in order to use the wifi network. Setting 1603*e* can be the "Password" setting, and can specify, for some types of wifi security specified by setting 1603*d*, the password required to use the wifi network. Setting 1603*f* can be the "Proxy" setting, and can specify how to connect to the outside network through a proxy, if required. Header 1602 can be for the "Enterprise Security" collection of settings and may only be enabled if setting 1603*d* is set to "WEP Enterprise". Header 1602 can indicate a collection of configuration settings 1603*g-h* to describe parameters for using WEP Enterprise security on wifi. Setting 1603*g* can be the "Accepted EAP Types" setting, and can specify which EAP methods to use for authentication in order to use the wifi network. Setting 1603*h* can be the "EAP-Fast" setting, and can specify the configuration of the EAP-Fast protected access credential settings.

It should be understood that in the embodiment depicted in FIG. 16, the names of the header 1602 and the names and values of the settings represented by 1603a-h are meant to be illustrative and not limiting.

Figure 17:
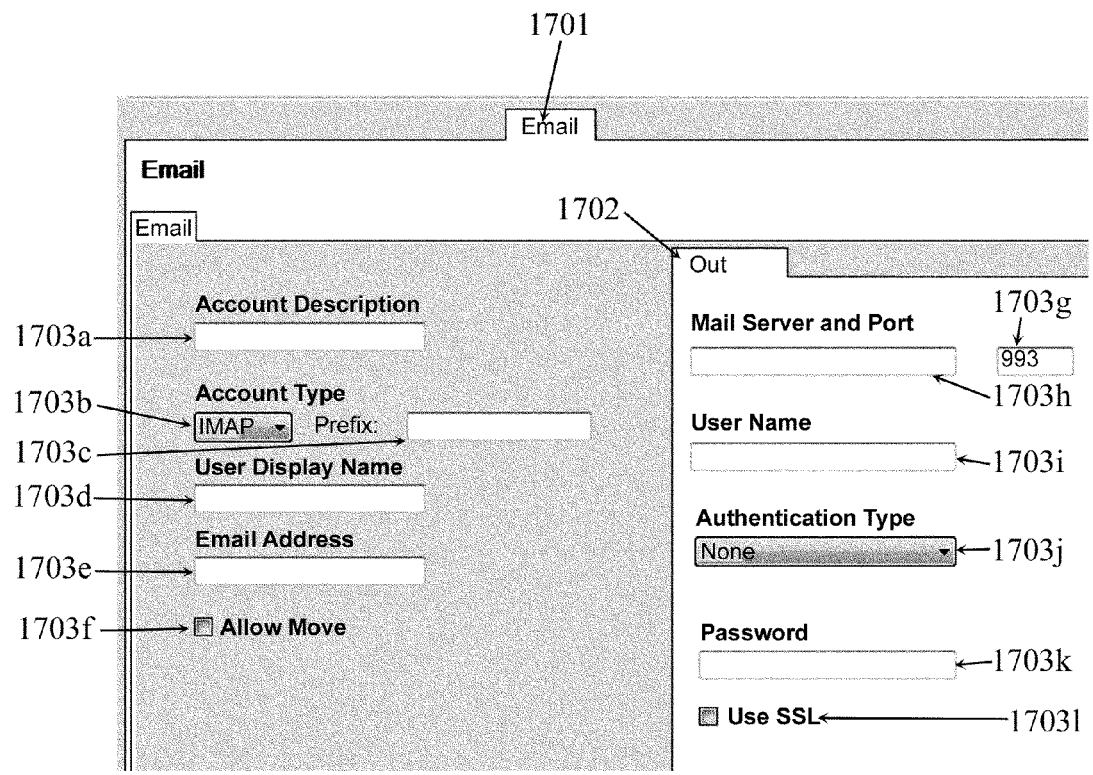
FIG. 17 is an illustrative example of an embodiment of a user interface for displaying and modifying an email settings configuration class.

FIG. 17 is an illustrative example of an embodiment of a user interface for displaying and modifying an email settings configuration class. Tab 1701 can select the user interface for an email settings configuration class. Header 1702 can facilitate the understanding of the controls 1703a-l by collecting the controls 1703a-l into logical sections and labeling those sections. The controls 1703a-l can display the current settings for the email configuration and enable modifying those settings. What follows is a description of the settings in the embodiment depicted in FIG. 17.

Setting 1703a can be the "Account Description" setting, and can specify the name for the account that is displayed on the device 203c. Setting 1703b can be the "Account Type" setting, and can specify the protocol to use when accessing the email server. Setting 1703c can be the "Path Prefix" setting, and can specify the path prefix parameter for the protocol if setting 1703b is set to "IMAP". Setting 1703d can be the "User Display Name" setting, and can specify the name of the device user that will be included in email headers. Setting 1703e can be the "Email Address" setting, and can specify the email address of the device user that will be used as a return address in email headers. Setting 1703f can be the "Allow Move" setting, and can specify whether or not to allow moving messages in this account to another account, and whether or not to allow using another account to reply to or forward a message in this account. Header 1602 can be for the "Outgoing Mail" collection of settings 1703g-l which can be a collection of configuration settings describing how to send email to the email server. The "Incoming Mail" settings are not shown in FIG. 17, but can be a similar collection of configuration settings that can describe how to receive email from the email server. Setting 1703g can be the "Port" setting, and can specify which TCP port to use to connect to the email server. Setting 1703h can be the "Mail Server" setting, and can specify the Internet address, as an IP address or domain name, of the email server. Setting 1703i can be the "User Name" setting, and can specify the username to use for authentication on the email server. Setting 1703j can be the "Authentication Type" setting, and can specify what type of authentication to use on the email server. Setting 1703k can be the "Password" setting, and can specify the password to use for authentication on the email server. Setting 1703l can be the "Use SSL" setting, and can specify whether or not to use the secure sockets layer (SSL) protocol when communicating with the email server.

It should be understood that in the embodiment depicted in FIG. 17, the names of the header 1702 and the names and values of the settings represented by 1703a-l are meant to be illustrative and not limiting.

Figure 18:
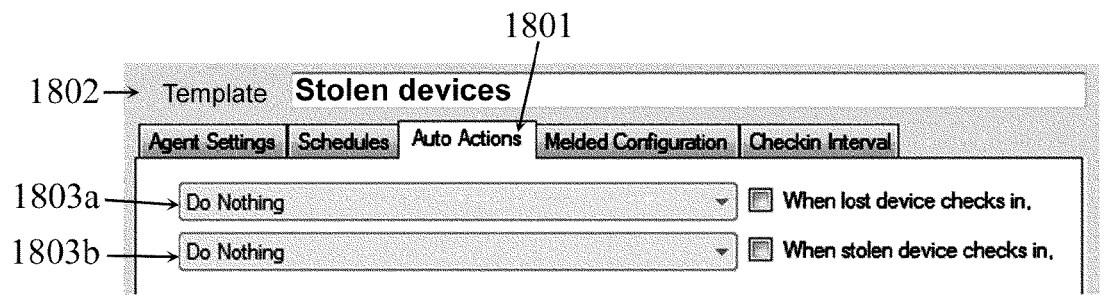
FIG. 18 is an illustrative example of an embodiment of a user interface for displaying and modifying the actions in response to a device being marked as lost or stolen.

FIG. 18 is an illustrative example of an embodiment of a user interface for displaying and modifying the actions in response to a device being marked as lost or stolen. Control 1802 can display and modify the name of a template that can be used to control the actions on devices 203a-u that are marked as lost or stolen. Tab 1801 can select the user interface for the actions that will be applied to devices 203a-u that are marked as lost or stolen. Control 1803a can specify the action taken on a device 203a-u marked as lost when it contacts the server 201. Control 1803b can specify the action taken on a device 203a-u marked as stolen when it contacts the server 201.

The options for controls 1803a-b can include: "Do Nothing", which may take no action; "Issue Lock Command", which may put the device 203a-u into a loop repeatedly locking the user interface, making it impossible for the end user to use the device 203a-u effectively; "Issue Wipe Device Command", which may erase all the data from the device 203a-u and return it to its factory settings, and "Set Device into Fast GPS Mode", which may cause the device 203a-u to report its location information to the server 201 every 30 seconds.

Figure 19:
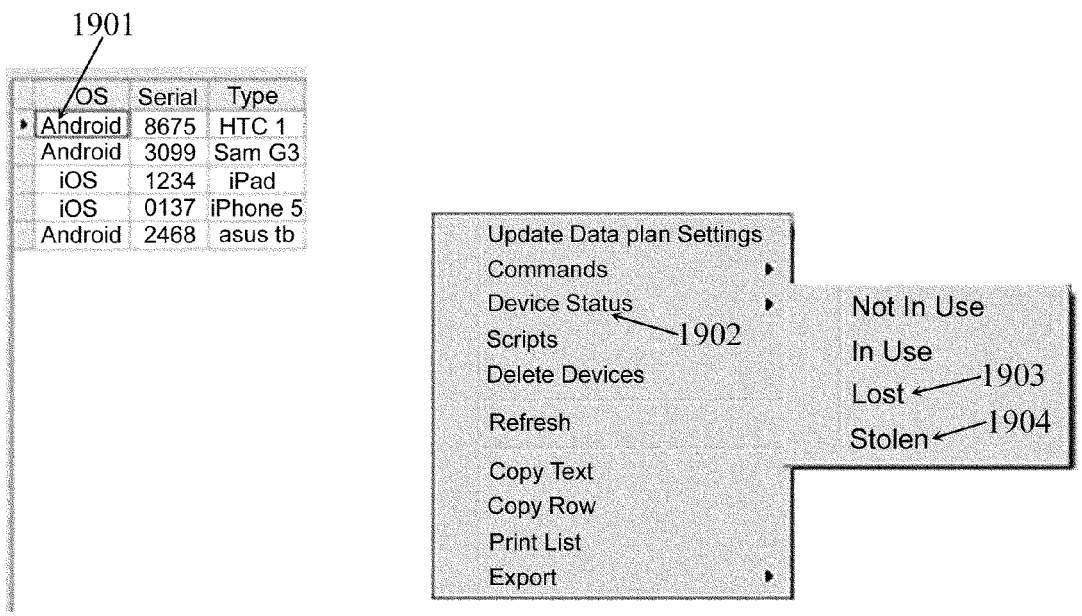
FIG. 19 is an illustrative example of an embodiment of a user interface for marking a device as being lost or stolen.

FIG. 19 is an illustrative example of an embodiment of a user interface for marking a device as being lost or stolen. A device 203c can be selected by right-clicking on it 1901. This may bring up a menu including a "device status" command 1902 that can be selected. The device 203c can be marked as lost by selecting the "Lost" menu item 1903, and can be marked as stolen by selecting the "Stolen" menu item 1904.

Figure 20:
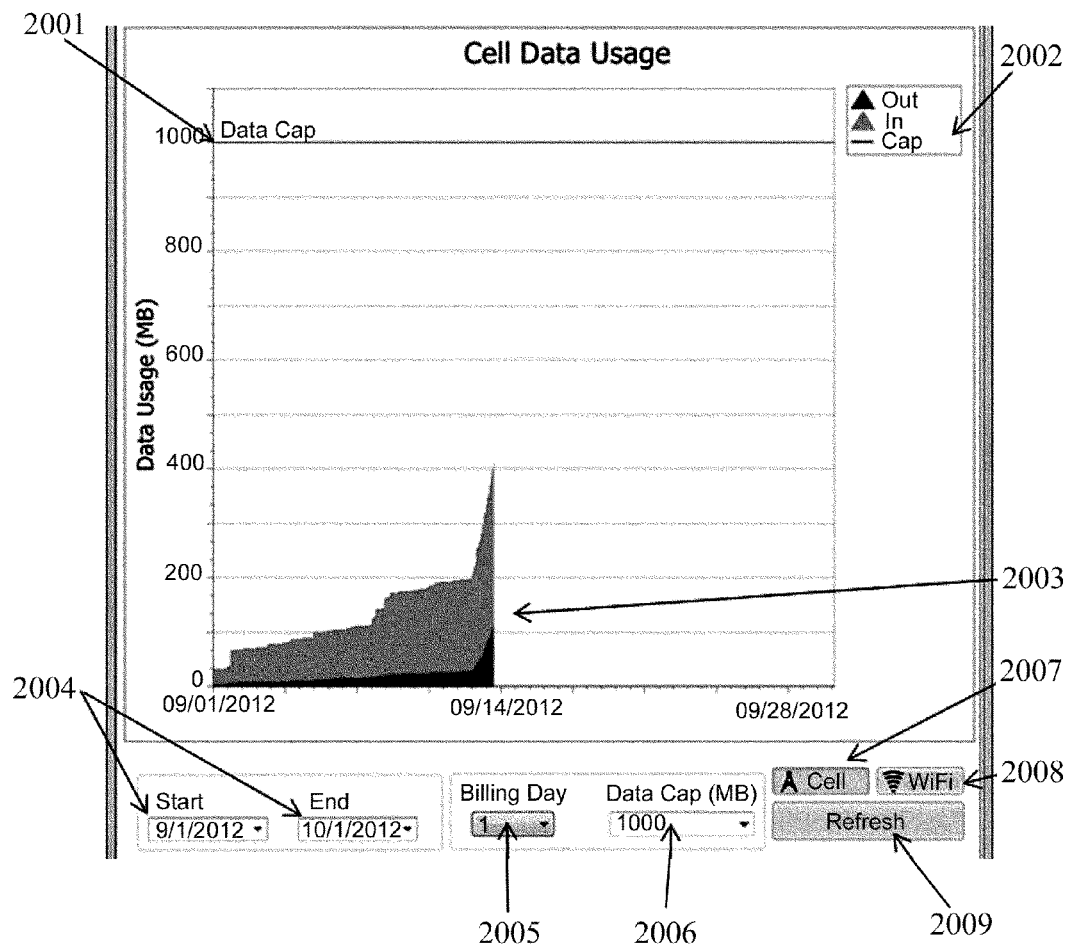
FIG. 20 is an illustrative example of an embodiment of a user interface for displaying and managing the cellular data usage of a device.

FIG. 20 is an illustrative example of an embodiment of a user interface for displaying and managing the cellular data usage of a device. The line 2001 can be a graphical indicator that can show the data cap that has been set. This may facilitate determining whether or not the device 203c is close to going over the maximum desired data usage. The area 2002 can be a legend that can display the color indicators used to display the amount of data received by the device 203c and the amount data sent by the device 203c, for both cellular data and Wifi data. The graph 2003 can be a graphical indication of the amount of data received and sent by the device 203c during the current billing cycle. The graph 2003 can use the colors and symbols described by the legend 2002. The controls 2004 can set the left and right end of the x axis of the graph 2003. The values for the controls 2004 may have defaults based on the billing cycle for the device 203c. The control 2005 can be a control to set the billing day, which can affect the default values for controls 2004. In one embodiment, if control 2005 is set to the 15th, the default Start Period may be set to the 15th for the current month and the default End Period may be set to the 15th of the next month. The control 2006 can be to set the Data Plan Cap in megabytes (MB). The control 2006 can affect the display of 2001. The control 2007 can be a button that can be selected to view the cell data usage. The control 2008 can be a button that can be selected to view the Wifi data usage. The control 2009 can be a button that can be selected to redraw the display.

Figure 21:
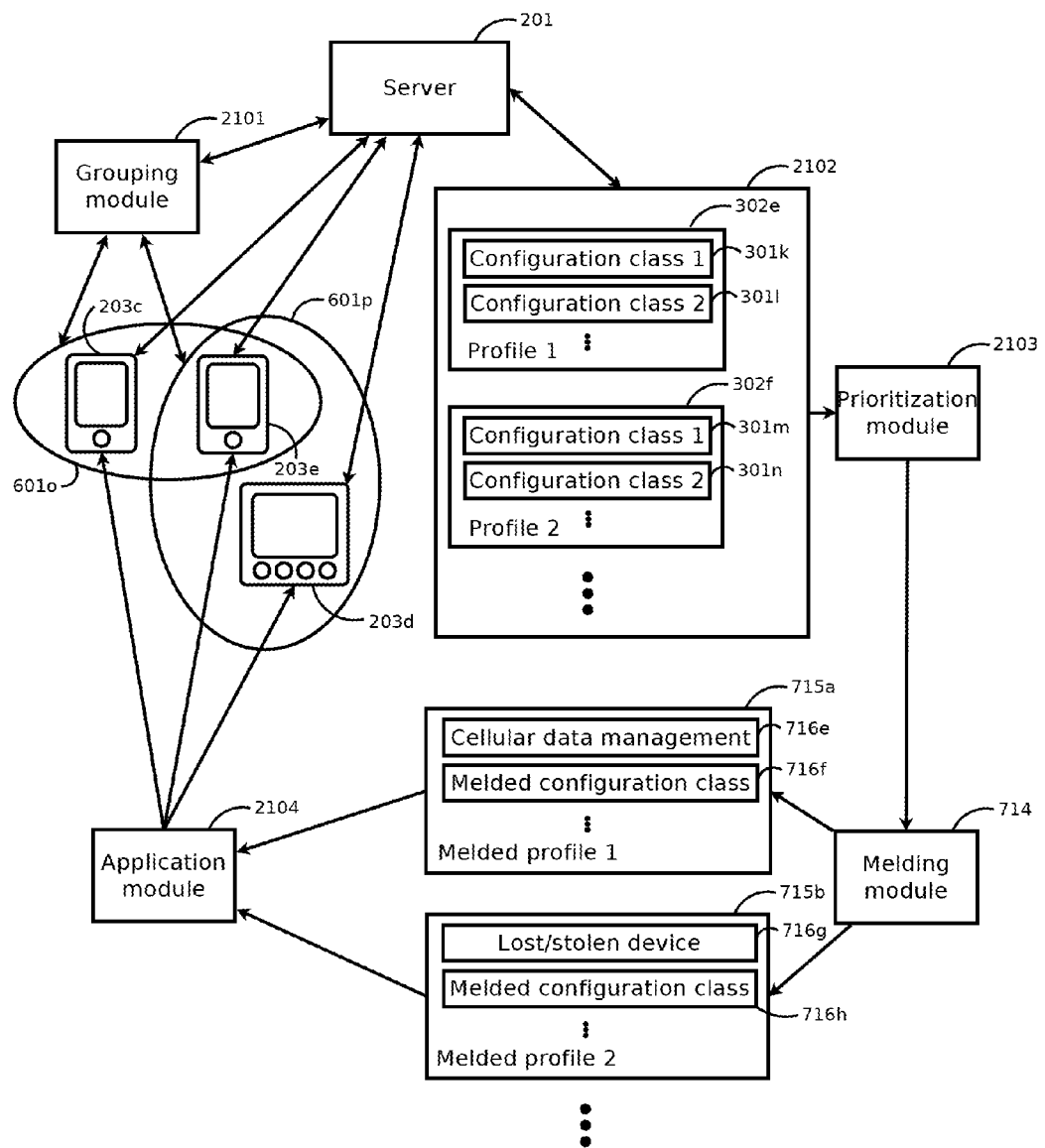
FIG. 21 is an illustrative block diagram of an embodiment of a system for providing melded profiles to manage multiple device types.

FIG. 21 is an illustrative block diagram of an embodiment of a system for providing melded profiles to manage multiple device types. A server 201 can be used to manage devices 203c-e, which may comprise multiple types of devices 203c-e. The server 201 may use a grouping module 2101 to logically organize the devices 203c-e into one or more groups 6010-p. The groups 6010-p may facilitate managing the devices 203c-e by the server 201, by facilitating the application of management functions to more than one device 203c-e. The server 201 can store profiles 302e-f in a memory 2102. The profiles 302e-f can include configuration classes 301k-n. A configuration class 301k-n can include configuration information to be applied to one or more devices 203c-e and may facilitate the management of the devices 203c-e. A prioritization module 2103 can select information from the profiles 302e-f and transmit the information to a melding module 714, which in turn can construct melded profiles 715a-b for devices 203c-e. The melded profiles 715a-b can include melded configuration classes 716e-h specific for the devices 203c-e, which can be derived from the configuration classes 301k-n in the profiles 302e-f by the prioritization module 2103 and the melding module 714. An application module 2104 can apply the appropriate melded profiles 715a-b to the devices 203c-e. In one embodiment, the melded profile 715a can include a melded configuration class 716e including configuration information for managing the cellular data usage of a device 203c. In one embodiment, the melded profile 715b can include a melded configuration class 716g with configuration information for managing a device 203d that is lost or stolen.

Figure 22:
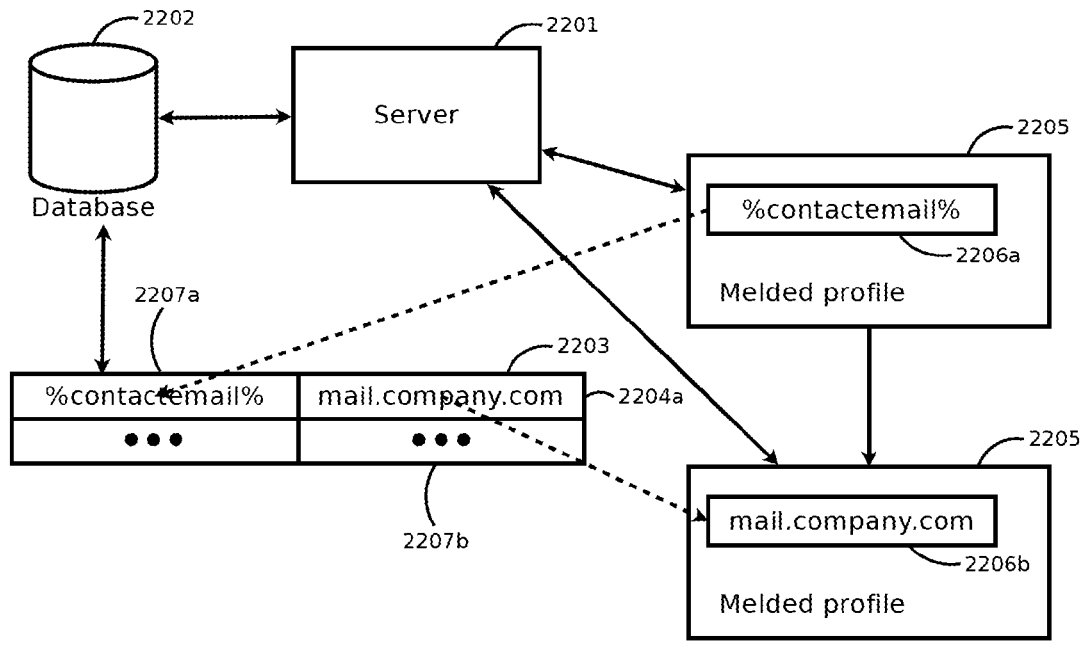
FIG. 22 is an illustrative block diagram of an embodiment of a system for substituting variable strings in a melded profile.

FIG. 22 is an illustrative block diagram of an embodiment of a system for substituting variable strings in a melded profile. A server 2201 can access a database 2202 to retrieve a table 2203 in which each row 2204a can map an input string 2207a to an output string 2207b. The server can extract a string 2206a from a melded profile 2205 and can use the string 2206a as an input string 2207a in the table 2203 to look up an output string 2207b. If an output string 2207b is found, the server 2201 can update the string 2206b in the melded profile 2205. In one embodiment, the contents of the table 2203 can depend on the melded profile 2205 and the method by which the melded profile 2205 was generated.

In some embodiments, the server 2201 in FIG. 22 can include components or functionality of the server 101 as described with respect to FIG. 1. In some embodiments, the melded profile 2205 in FIG. 22 can include components or functionality of the melded profiles 118a-b as described with respect to FIG. 1. In some embodiments, the database 2202 in FIG. 22 can include components or functionality of the database 111 as described with respect to FIG. 1.

Figure 23:
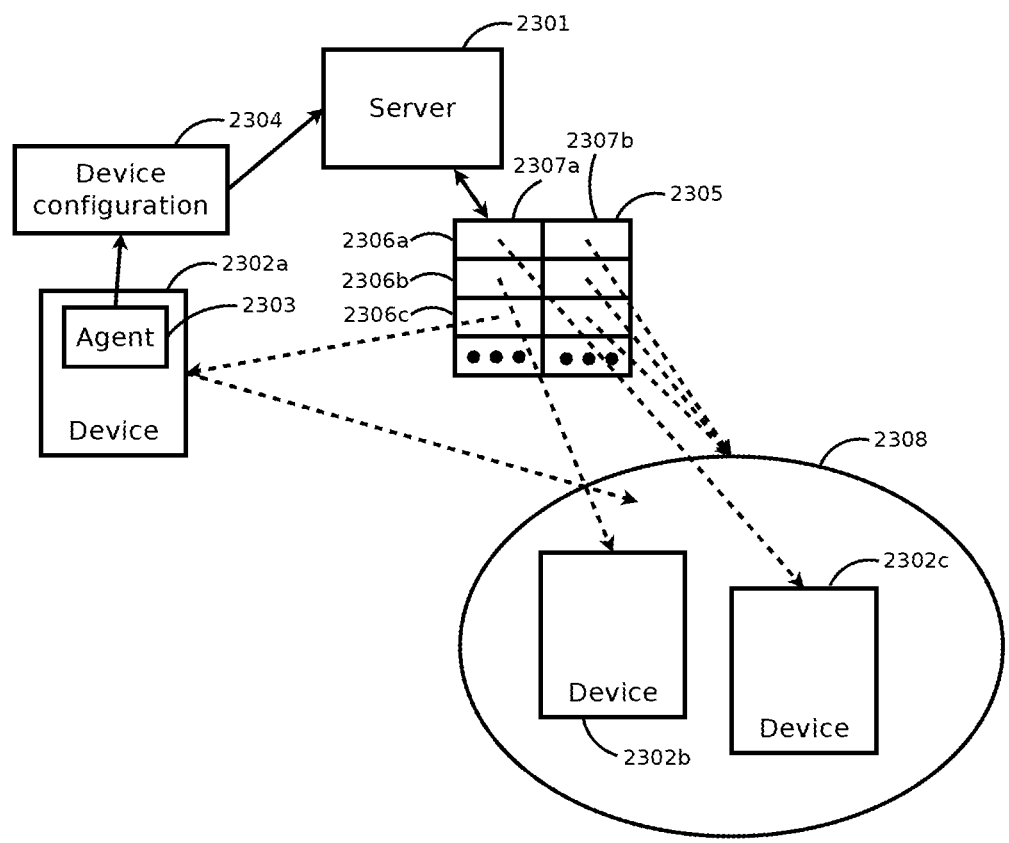
FIG. 23 is an illustrative block diagram of an embodiment of a system for automatically placing a device into a group.

FIG. 23 is an illustrative block diagram of an embodiment of a system for automatically placing a device into a group. An agent 2302 running on a computing device 2302a can send a device configuration 2304, which can describe the device 2302a, to a server 2301. The server 2301 can access a table 2305 that can associate devices 2302a-c to groups 2308. Each row 2306a-c in the table 2308 may represent a device 2302a-c, and each row 2306a-c may have a column 2307a that can have a reference to a device 2302a-c and a column 2307b that can have a reference to a group 2308. Based on the information in the device configuration 2304, the server 2301 may add a new row 2306c that can reference the device 2302a and the group 2308. In the embodiment depicted in FIG. 23, the device 2302a may share a characteristic with devices 2302b-c that may imply that it belongs to group 2308, and the server 2301 may use information in the device configuration 2304 to infer this characteristic, thereby placing the device 2302a in the group 2308 without any manual intervention.

In one embodiment, the group 2308 may represent lost or stolen devices, and the server 2301 may use a device location in the device configuration 2304 to determine that the device 2302a is no longer in its "allowed" territory, and can thereby be classified as lost or stolen and placed into group 2308.

In some embodiments, the server 2301 in FIG. 23 can include components or functionality of the server 101 as described with respect to FIG. 1. In some embodiments, the computing devices 2302a-c in FIG. 23 can include components or functionality of the computing devices 103a-b as described with respect to FIG. 1. In some embodiments, the agent 2303 in FIG. 23 can include components or functionality of the agents 103a-b as described with respect to FIG. 1. In some embodiments, the group 2308 in FIG. 23 can include components or functionality of the groups 107a-b as described with respect to FIG. 1. In some embodiments, the mapping table 2305 in FIG. 23 can include components or functionality of the mapping table 108 as described with respect to FIG. 1.

Figure 24:
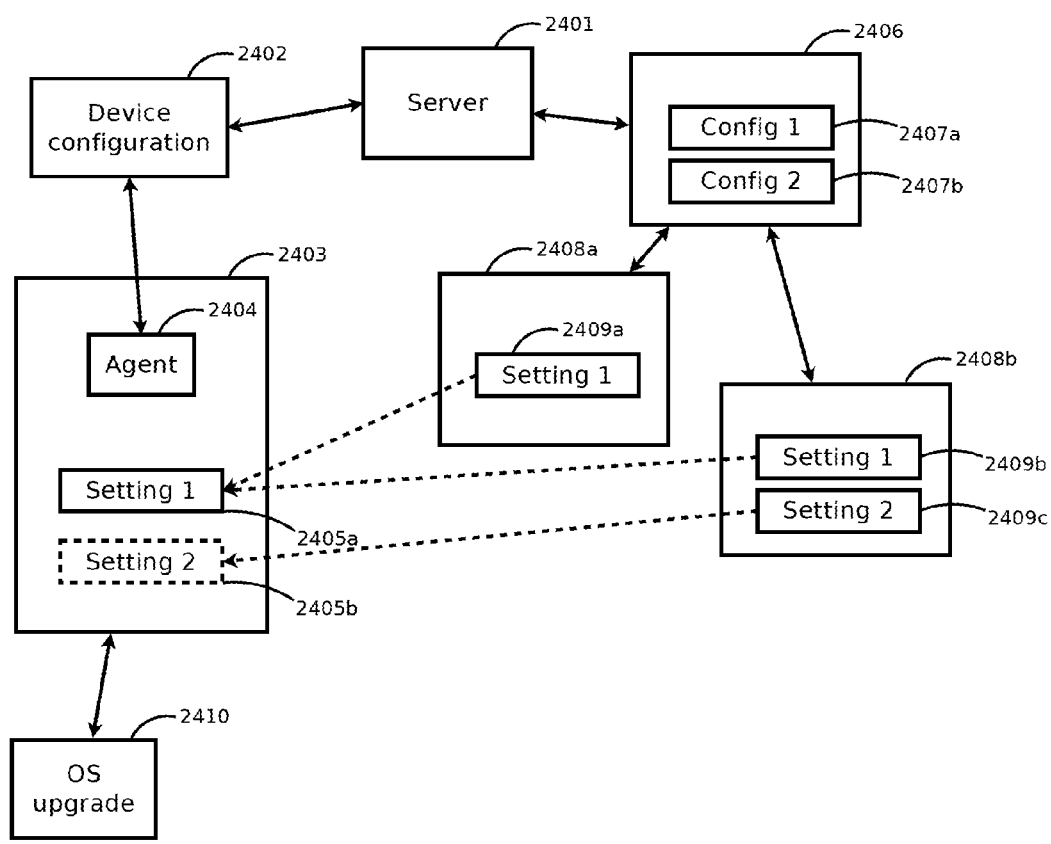
FIG. 24 is an illustrative block diagram of an embodiment of a system for updating a device when a new configuration option becomes available.

FIG. 24 is an illustrative block diagram of an embodiment of a system for updating a device when a new configuration option becomes available. An agent 2404 can be running on a device 2403 where setting 2405a is available, but setting 2405b is not supported on the device 2403. The agent 2404 can send a device configuration 2402 to a server 2401. The server 2401 can use the device configuration 2402 and a configuration class 2406 to create a melded profile 2408a for the device 2403. In creating the melded profile 2408a, the configuration 2407a can be used to create the setting 2409a, and the server 2401 may determine that configuration 2407b does not apply to the device 2403, so nothing is placed into the melded profile 2408a. When the server 2401 applies the melded profile 2408a to the device 2403, the setting 2409a in the melded profile 2408a is used to update the setting 2405a.

At some point in time, an operating system upgrade 2410 may be applied to the device 2403, and as a result, the setting 2405b may now become available. The agent 2404 can send a new device configuration 2402 to the server 2401. With this new device configuration 2402, the server 2401 may create a new melded profile 2408b from the same configuration class 2406. The new melded profile 2408b may include a setting 2409b created from configuration 2407a, and may include a setting 2409c created from configuration 2407b. The server 2401 may determine that the new melded profile 2408b is different from the previous melded profile 2408a, and as a result, may apply the new melded profile 2408b to the device 2403. The setting 2409b can be used to update the setting 2405a, and the setting 2409c can be used to update the setting 2405b, which is now available after the operating system upgrade 2410.

In some embodiments, the server 2401 in FIG. 24 can include components or functionality of the server 101 as described with respect to FIG. 1. In some embodiments, the agent 2404 in FIG. 24 can include components or functionality of the agents 103a-b as described with respect to FIG. 1. In some embodiments, the computing device 2403 in FIG. 24 can include components or functionality of the computing devices 102a-b as described with respect to FIG. 1. In some embodiments, the device configuration 2402 in FIG. 24 can include components or functionality of the device types 104a-b as described with respect to FIG. 1. In some embodiments, the configuration class 2406 in FIG. 24 can include components or functionality of the configuration classes 113a-b as described with respect to FIG. 1. In some embodiments, the melded profiles 2408a-b in FIG. 24 can include components or functionality of the melded profiles 118a-b as described with respect to FIG. 1. In some embodiments, the configurations 2407a-b in FIG. 24 can include components or functionality of the configuration options 303a-b as described with respect to FIG. 3. In some embodiments, the settings 2409a-c in FIG. 24 can include components or functionality of the melded configuration classes 716a-d as described with respect to FIG. 7B. In some embodiments, the settings 2405a-b in FIG. 24 can include components or functionality of the local configuration storage 718 as described with respect to FIG. 7B.

Figure 25:
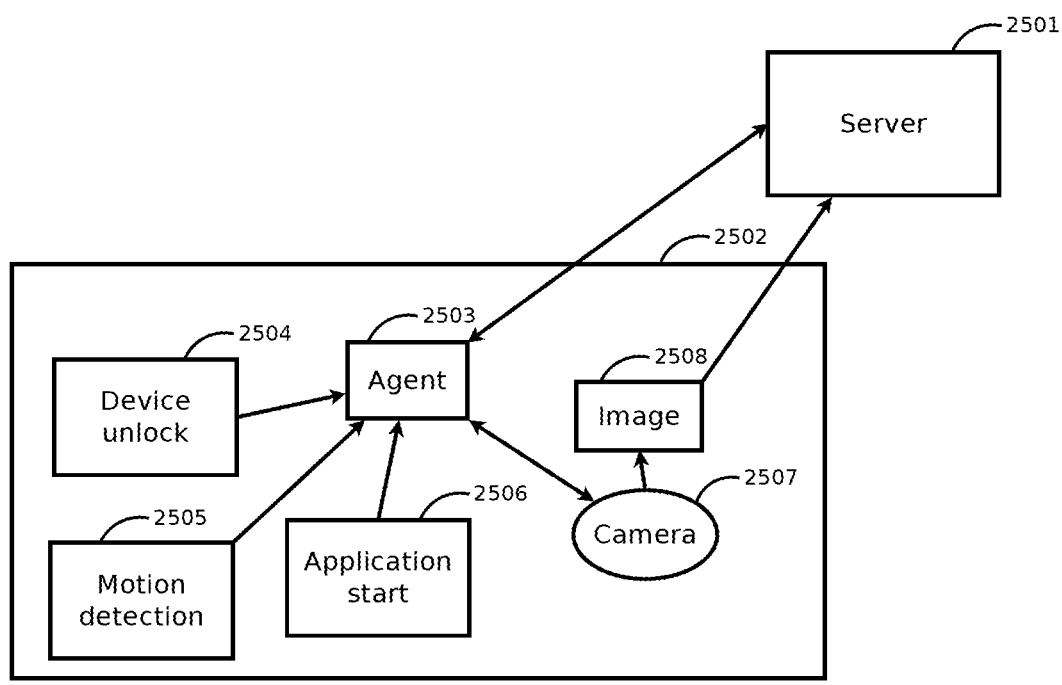
FIG. 25 is an illustrative block diagram of an embodiment of a system for acquiring images from a lost or stolen device.

FIG. 25 is an illustrative block diagram of an embodiment of a system for acquiring images from a lost or stolen device. A server 2501 can send an indication to an agent 2503 running on a computing device 2502 indicating that the device 2502 is lost or stolen. Upon receiving this indication, the agent 2503 can monitor signals indicating that the device 2502 is being unlocked 2504 for use, is moving 2505, or has an application starting 2506 for use. Any of these signals 2504-2506 may indicate that a person is using the device, so the agent 2503 can use a camera 2507 on the device 2502 to capture an image 2508. The agent 2503 can send the image 2508 to the server 2501. The image 2508 may facilitate finding and recovering the device 2502.

In one embodiment, the agent 2503 can contact the server 2501 periodically, with a time interval between contacts. The server 2501 can send an indication to the agent 2503 indicating that the device 2502 is lost or stolen. As a result, the agent 2503 can reduce the time interval between contacts, which can cause the agent 2503 to contact the server 2501 more frequently. This can facilitate tracking the device 2502 and getting timely information as the situation changes.

In some embodiments, the server 2501 in FIG. 25 can include components or functionality of the server 101 as described with respect to FIG. 1. In some embodiments, the computing device 2502 in FIG. 25 can include components or functionality of the computing devices 102*a-b* as described with respect to FIG. 1. In some embodiments, the agent 2503 in FIG. 25 can include components or functionality of the agents 103*a-b* as described with respect to FIG. 1.

Figure 26:
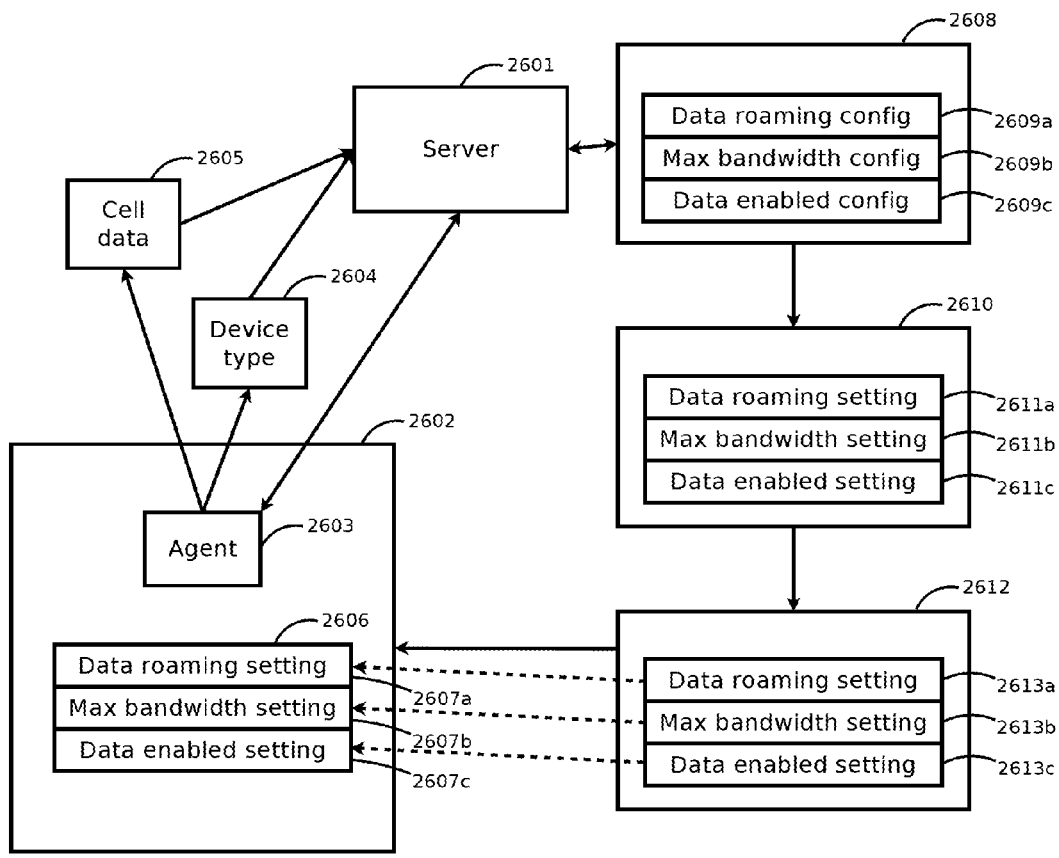
FIG. 26 is an illustrative block diagram of an embodiment of a system for managing cellular data usage on a device.

FIG. 26 is an illustrative block diagram of an embodiment of a system for managing cellular data usage on a device. An agent 2603 running on a computing device 2602 can send a device type 2604 and a set of cellular data 2605 to a server 2601. The cellular data 2605 may include statistics about the usage of cellular data by the device 2602, and may also include settings 2607*a-c* that may affect the usage of cellular data by the device 2602. The settings 2607*a-c* may be stored in a local configuration memory 2606. The server 2601 can access a configuration class 2608 that may include configurations 2609*a-c* that can affect the usage of cellular data. The server 2601 can use the configuration class 2608, along with the device type 2604 and the cellular data 2605, to create a device-dependent configuration 2610 for the device 2602 that may include settings 2611*a-c* that can affect the usage of cellular data. The server 2601 can use the device-dependent configuration 2610 to created a melded profile 2612 for the device 2602 which can include settings 2613*a-c* that can affect the usage of cellular data. The server 2601 can apply the melded profile 2612 to the device 2602, which may cause the settings 2613*a-c* in the melded profile 2612 to update the settings 2607*a-c* on the device 2602. In the embodiment depicted in FIG. 26, the settings 2607*a*, 2609*a*, 2611*a*, and 2613*a* relate to whether cellular data is enabled on the device 2602 when it is roaming. In the embodiment depicted in FIG. 26, the settings 2607*b*, 2609*b*, 2611*b*, and 2613*b* relate to the maximum bandwidth that is allowed for cellular data on the device 2602. In the embodiment depicted in FIG. 26, the settings 2607*c*, 2609*c*, 2611*c*, and 2613*c* relate to whether cellular data is enabled at all on the device 2602.

In some embodiments, the server 2601 in FIG. 26 can include components or functionality of the server 101 as described with respect to FIG. 1. In some embodiments, the computing device 2602 in FIG. 26 can include components or functionality of the computing devices 102*a-b* as described with respect to FIG. 1. In some embodiments, the agent 2603 in FIG. 26 can include components or functionality of the agents 103*a-b* as described with respect to FIG. 1. In some embodiments, the device type 2604 in FIG. 26 can include components or functionality of the device types 104*a-b* as described with respect to FIG. 1. In some embodiments, the local configuration memory 2606 in FIG. 26 can include components or functionality of the local configuration memory 718 as described with respect to FIG. 7B. In some embodiments, the configuration class 2608 in FIG. 26 can include components or functionality of the configuration classes 113*a-b* as described with respect to FIG. 1. In some embodiments, the device-dependent class 2610 in FIG. 26 can include components or functionality of the device-dependent classes 117*a-b* as described with respect to FIG. 1. In some embodiments, the melded profile 2612 in FIG. 26 can include components or functionality of the melded profiles 118*a-b* as described with respect to FIG. 1.

Figure 27:
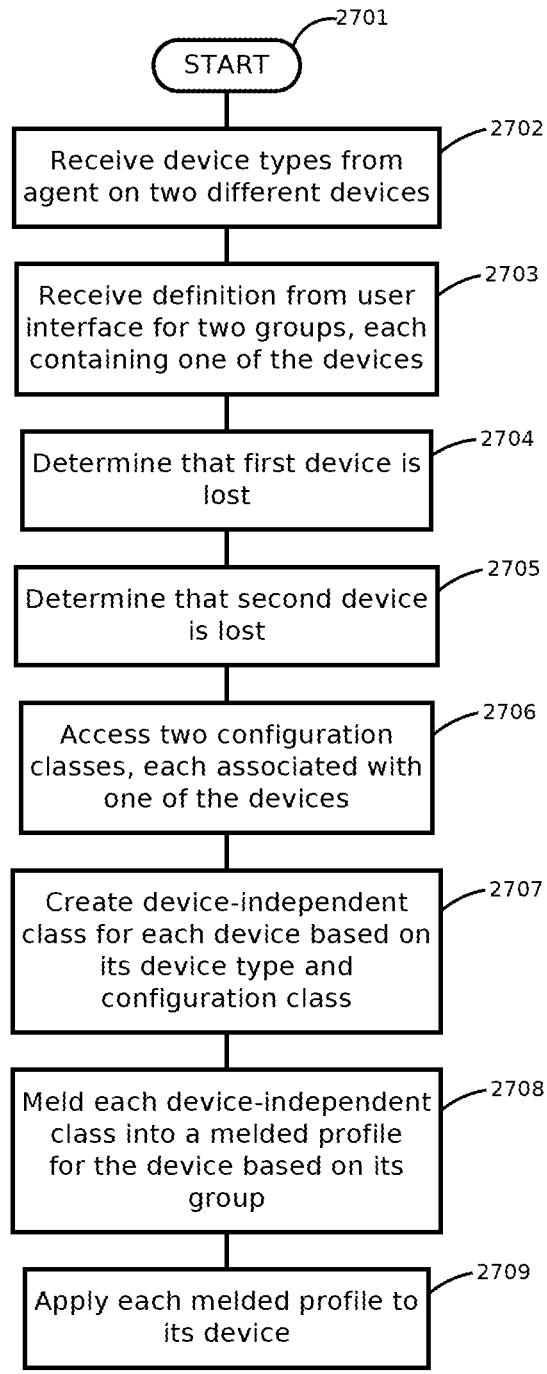
FIG. 27 is an illustrative flowchart depicting an example embodiment of a method of managing lost devices of multiple types with multiple policies using melded profiles associated with groups.

FIG. 27 is an illustrative flowchart depicting an example embodiment of a method of managing lost devices of multiple types with multiple policies using melded profiles associated with groups. The method 2701 can include receiving device types from an agent on two different devices (2702). The method 2701 can include receiving the definition for two groups, each including one of the devices, from a user interface (2703). The method 2701 can include determining that the first device is lost (2704). The method 2701 can include determining that the second device is lost (2705). The method 2701 can include accessing two configuration classes, each of which is associated with one of the devices (2706). The method 2701 can include creating a device-independent class for each device based on its device type and configuration class (2707). The method 2701 can include melding each device-independent class into a melded profile for the device based on its group (2708). The method 2701 can include applying each melded profile to its device (2709).

Figure 28:
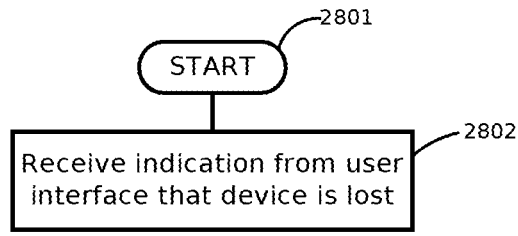
FIG. 28 is an illustrative flowchart depicting an example embodiment of a method of indicating that a device is lost.

FIG. 28 is an illustrative flowchart depicting an example embodiment of a method of indicating that a device is lost. The method 2801 can include receiving an indication from a user interface that the device is lost (2802).

Figure 29:
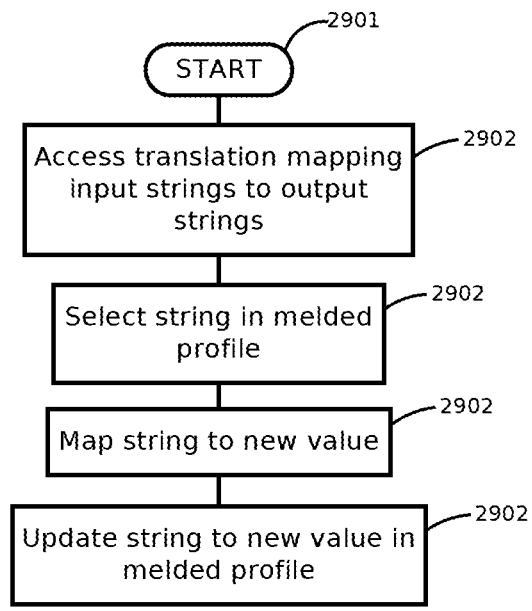
FIG. 29 is an illustrative flowchart depicting an example embodiment of a method of substituting strings in a melded profile.

FIG. 29 is an illustrative flowchart depicting an example embodiment of a method of substituting strings in a melded profile. The method 2901 can include accessing a translation that maps input strings to output strings (2902). The method 2901 can include selecting a string in melded profile (2903). The method 2901 can include mapping the string to a new value (2904). The method 2901 can include updating the string to the new value in the melded profile (2905).

Figure 30:
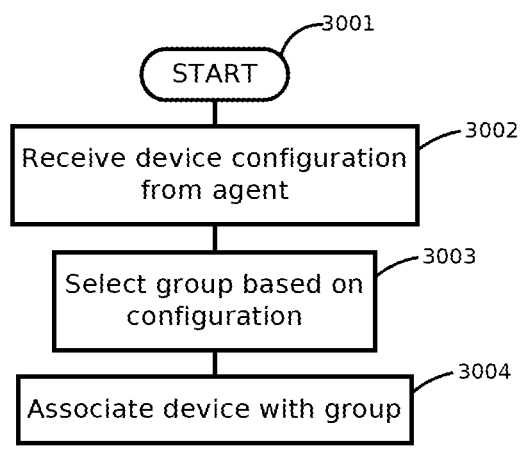
FIG. 30 is an illustrative flowchart depicting an example embodiment of a method of automatically assigning a device to a group.

FIG. 30 is an illustrative flowchart depicting an example embodiment of a method of automatically assigning a device to a group. The method 3001 can include receiving a device configuration from an agent (3002). The method 3001 can include selecting a group based on the device configuration (3003). The method 3001 can include associating the device with the group (3004).

Figure 31:
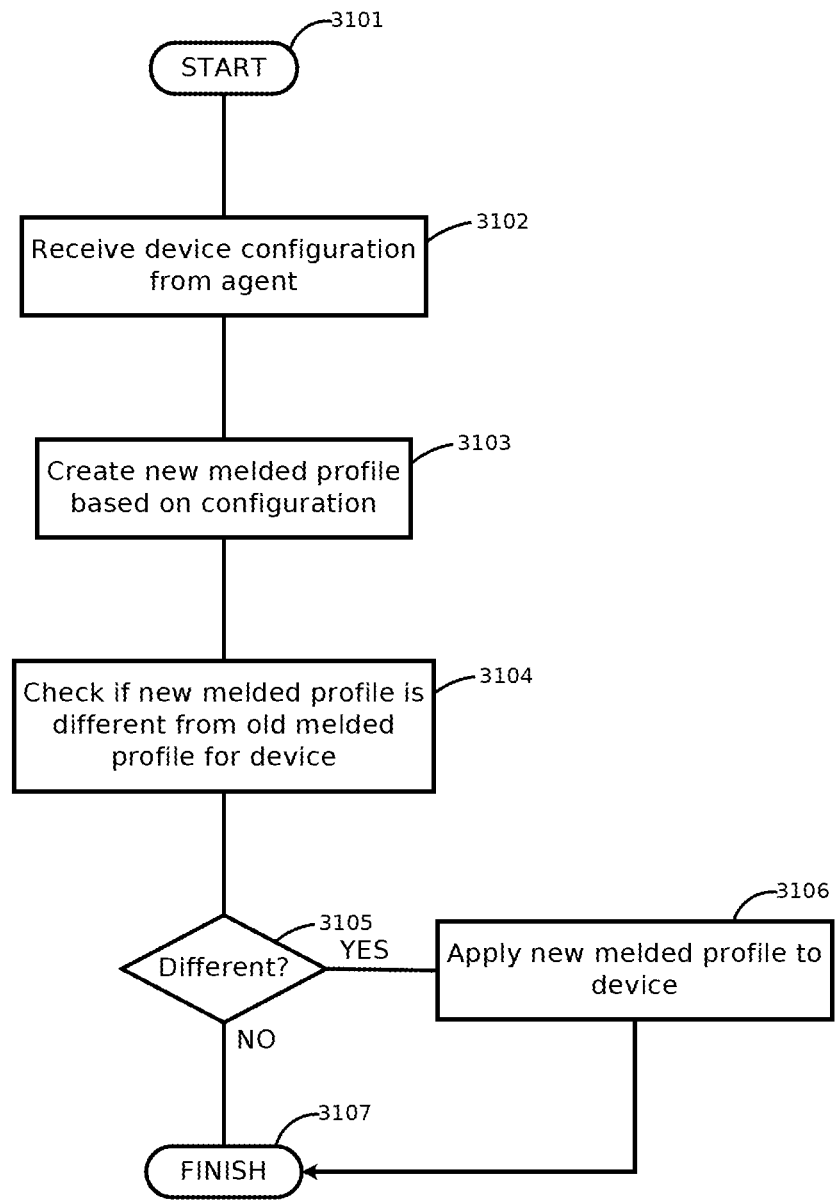
FIG. 31 is an illustrative flowchart depicting an example embodiment of a method of updating a device after a change in configuration capability.

FIG. 31 is an illustrative flowchart depicting an example embodiment of a method of updating a device after a change in configuration capability. The method 3101 can include receiving a device configuration from an agent (3102). The method 3101 can include creating a new melded profile based on the device configuration (3103). The method 3101 can include checking if the new melded profile is different from the old melded profile for the device (3104). The method 3101 can include checking whether there is a difference (3105). In some embodiments, the method 3101 can include applying the new melded profile to the device (3106). The method 3101 can include joining a plurality of control flows (3107).

Figure 32:
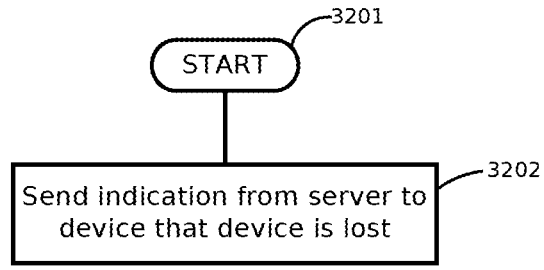
FIG. 32 is an illustrative flowchart depicting an example embodiment of a method of indicating to a device that it is lost.

FIG. 32 is an illustrative flowchart depicting an example embodiment of a method of indicating to a device that it is lost. The method 3201 can include sending an indication from the server to the device that the device is lost (3202).

Figure 33:
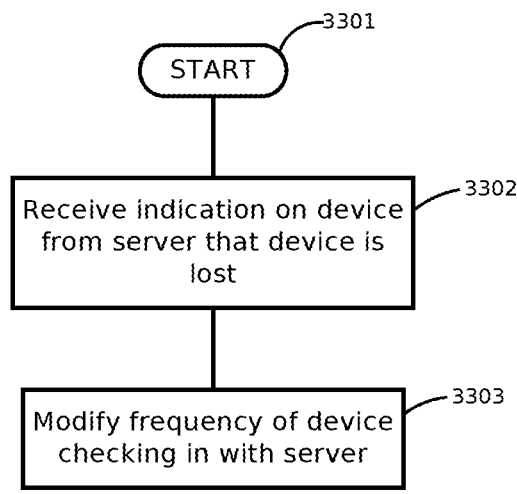
FIG. 33 is an illustrative flowchart depicting an example embodiment of a method of increasing the contact frequency of a lost device.

FIG. 33 is an illustrative flowchart depicting an example embodiment of a method of increasing the contact frequency of a lost device. The method 3301 can include receiving an indication on the device from the server that the device is lost (3302). The method 3301 can include modifying the frequency of the device checking in with the server (3303).

Figure 34:
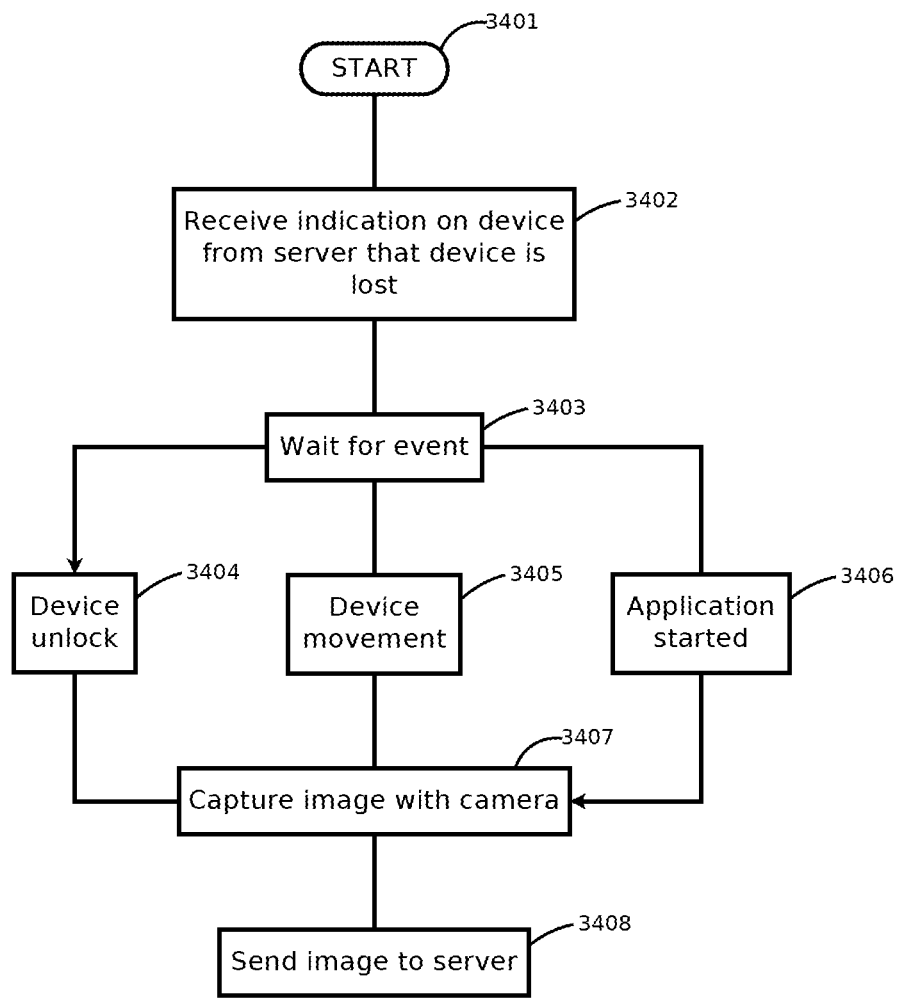
FIG. 34 is an illustrative flowchart depicting an example embodiment of a method of capturing images on a lost device.

FIG. 34 is an illustrative flowchart depicting an example embodiment of a method of capturing images on a lost device. The method 3401 can include receiving an indication on the device from the server that the device is lost (3402). The method 3401 can include waiting for an event (3403). The method 3401 can include detecting an operation unlocking the device (3404). The method 3401 can include detecting movement by the device (3405). The method 3401 can include detecting an operation starting an application on the device (3406). The method 3401 can include capturing an image with the camera on the device (3407). The method 3401 can include sending the image to the server (3408).

Figure 35:
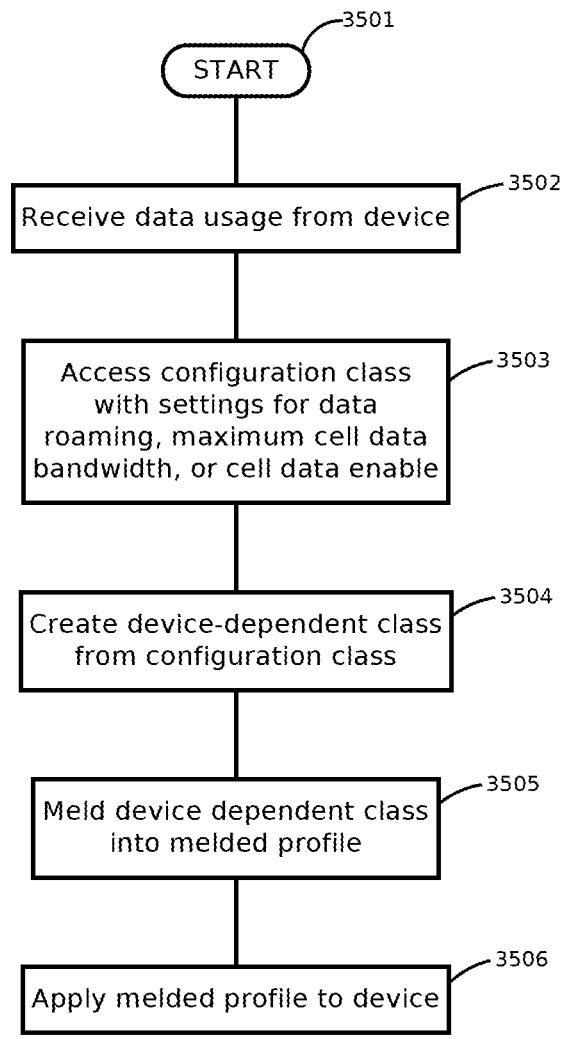
FIG. 35 is an illustrative flowchart depicting an example embodiment of a method of managing cell data usage on a device.

FIG. 35 is an illustrative flowchart depicting an example embodiment of a method of managing cell data usage on a device. The method 3501 can include receiving data usage from a device (3502). The method 3501 can include accessing a configuration class with settings for data roaming, maximum cell data bandwidth, or cell data enable (3503). The method 3501 can include creating a device-dependent class from the configuration class (3504). The method 3501 can include melding device dependent class into a melded profile (3505). The method 3501 can include applying the melded profile to the device (3506).

Figure 36:
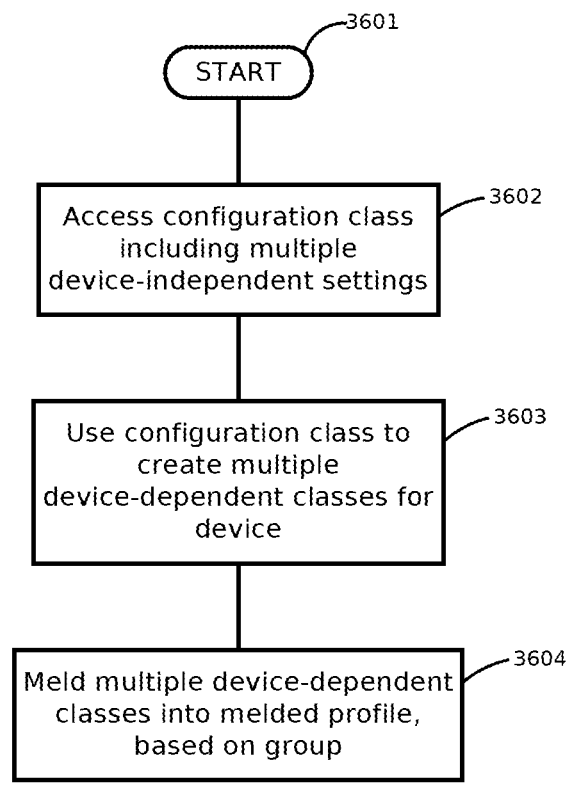
FIG. 36 is an illustrative flowchart depicting an example embodiment of a method of creating a melded profile from multiple device-independent settings.

FIG. 36 is an illustrative flowchart depicting an example embodiment of a method of creating a melded profile from multiple device-independent settings. The method 3601 can include accessing a configuration class that includes multiple device independent settings (3602). The method 3601 can include using the configuration class to create multiple device-dependent classes for a device (3603). The method 3601 can include melding the multiple device-dependent classes into a melded profile, based on a group (3604).

Figure 37:
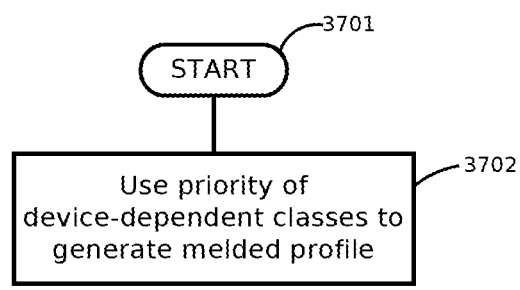
FIG. 37 is an illustrative flowchart depicting an example embodiment of a method of creating a melded profile using priorities.

FIG. 37 is an illustrative flowchart depicting an example embodiment of a method of creating a melded profile using priorities. The method 3701 can include using a priority of multiple device-dependent classes to generate a melded profile (3702).

Figure 38:
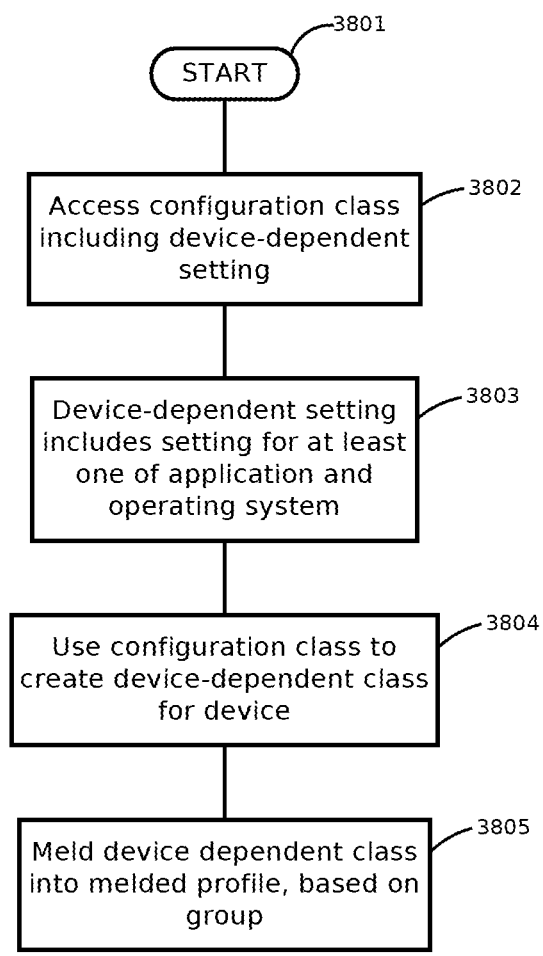
FIG. 38 is an illustrative flowchart depicting an example embodiment of a method of creating a melded profile from a device-independent setting.

FIG. 38 is an illustrative flowchart depicting an example embodiment of a method of creating a melded profile from a device-independent setting. The method 3801 can include accessing a configuration class that includes a device-independent setting (3802). The method 3801 can include having the device-dependent setting include a setting for at least one of an application and an operating system on the device (3803). The method 3801 can include using the configuration class to create a device-dependent class for the device (3804). The method 3801 can include melding the device-dependent class into a melded profile, based on a group (3805).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for managing lost devices via a computer network, comprising:
   receiving, by a server from a first agent executing on a first device, a first device type;
   receiving, by the server from a second agent executing on a second device, a second device type, the second device type different from the first device type;
   receiving, by the server from a user interface, a first group associated with the first device and a second group associated with the second device, the second group different from the first group;
   determining, by the server, that the first device is lost;
   determining, by the server, that the second device is lost;
   accessing, by the server responsive to determining that at least one of the first device and second device is lost, a database storing, in memory, a first configuration class associated with the first device and a second configuration class associated with the second device;
   creating, by the server, based on the first device type and the first configuration class, a first device-dependent class;
   creating, by the server, based on the second device type and the second configuration class, a second device-dependent class;
   melding, by the server based on the first group, the first device-dependent class into a first melded profile;
   melding, by the server based on the second group, the second device-dependent class into a second melded profile; and
   applying, by the server, the first melded profile to the first device that is lost and the second melded profile to the second device that is lost.

2. The method of claim 1, further comprising:
   receiving, by the server from a second user interface, an indication that the first device is lost.

3. The method of claim 1, wherein the first configuration class comprises:
   a first setting operable to control a first aspect of a third device; and
   a second setting operable to control a second aspect of a fourth device;
   wherein the first aspect and the second aspect are associated with a management function.

4. The method of claim 3, wherein the first device-dependent class comprises:
   a first device setting determined based on the first setting and the first device type, the third device type same as the first device type; and
   a second device setting determined based on the first setting and the first device type, the fourth device type same as the first device type and the first aspect different from the second aspect.

5. The method of claim 4, wherein the first melded profile comprises:
   the first device-dependent class, the first-device dependent class associated with the first group; and
   a third device-dependent class associated with the first group and the first aspect;
   wherein:
      the first device is associated with the first group; and
      the first device setting of the first device-dependent class is combined with the first device setting of the third device-dependent class by selecting at least one of:
      a priority of the first device setting;
      a list of the first device setting; and
      a computation based on the first device setting.

6. The method of claim 1, further comprising:
   accessing, by the server from the database, a translation mapping a plurality of input strings into a plurality of output strings;
   selecting, by the server from the first melded profile, a variable string;
   mapping, by the server, based on the translation, the variable string to a variable value; and
   replacing, by the server in the first melded profile, the variable string with the variable value.

7. The method of claim 1, further comprising:
   receiving, by the server from the first agent, a configuration of the first device;
   selecting, by the server responsive to the receiving of the configuration, based on the configuration, a third group; and
   associating, by the server responsive to the selection, the first device with the third group.

8. The method of claim 1, further comprising:
   receiving, by the server from the first agent, a configuration of the first device;
   creating, by the server responsive to the receiving of the configuration, based on the first device type, the first configuration class, and the configuration, a third device-dependent class;
   melding, by the server, responsive to the creating, based on the first group, the third device-dependent class into a third melded profile; and
   applying, by the server, responsive to the third melded profile being different from the first melded profile, the third melded profile to the first device.

9. The method of claim 1, further comprising:
   sending, by the server to the first agent, responsive to the indication that the first device is lost, an instruction indicating that the first device is lost.

10. The method of claim 9, further comprising:
    receiving, by the first agent, the indication that the first device is lost; and
    modifying, by the first agent responsive to the receiving, a frequency of contacting the server to be more frequent.

11. The method of claim 9, further comprising:
    receiving, by the first agent, the indication that the first device is lost;
    determining, by the first agent responsive to the receiving, an indication of an activity on the first device, the indication based on a detection of one condition selected from:
    an unlocking of the first device;
    a movement of the first device; and
    a starting of an application on the first device;
    acquiring, by the first agent responsive to the indication of the activity, an image from a camera on the first device; and
    transmitting, by the first agent to the server responsive to the acquiring, the image.

12. The method of claim 1, further comprising
receiving, by the server from the first agent, a record of cellular data usage on the first device;
accessing, by the server responsive to receiving the record of cellular data usage, a third configuration class associated with the first device, the third configuration class including one configuration selected from:
an enabling of data roaming;
a setting of maximum utilized bandwidth; and
an enabling of cellular data based on time of day;
creating, by the server, based on the first device type and the third configuration class, a third device-dependent class;
melding, by the server based on the first group, the third device-dependent class into a third melded profile; and
applying, by the server, responsive to the melding, the third melded profile to the first device.

13. The method of claim 1, further comprising:
accessing, by the server, the first configuration class including a first plurality of device-independent settings;
using, by the server, the first configuration class including the plurality of first device-independent settings to create a plurality of first device-dependent classes for the first device; and
melding, by the server based on the first group, the first plurality of device-dependent classes into the first melded profile.

14. The method of claim 1, further comprising:
using, by the server, a priority of each of the first plurality of device-dependent classes to generate the first melded profile.

15. The method of claim 1, further comprising:
accessing, by the server, the first configuration class including a first device-independent setting for at least one of an application on the first device and an operating system of the first device; and
using, by the server, the first configuration class including the first device-independent setting to create a first device-dependent class for the first device.

16. A system for managing lost devices via a computer network, comprising:
a server including a processor and memory configured to:
receive, from a first agent executing on a first device, a first device type;
receive, from a second agent executing on a second device, a second device type, the second device type different from the first device type;
receive, from a user interface, a first group associated with the first device and a second group associated with the second device, the second group different from the first group;
determine that the first device is lost;
determine that the second device is lost;
access, responsive to determining that at least one of the first device and second device is lost, a database storing a first configuration class associated with the first device and a second configuration class associated with the second device;
create, based on the first device type and the first configuration class, a first device-dependent class;
create, based on the second device type and the second configuration class, a second device-dependent class;
meld, based on the first group, the first device-dependent class into a first melded profile;
meld, based on the second group, the second device-dependent class into a second melded profile; and
apply the first melded profile to the first device that is lost and the second melded profile to the second device that is lost.

17. The system of claim 16, the server further configured to:
receive, from a second user interface, an indication that the first device is lost.

18. The system of claim 16, wherein the first configuration class comprises:
a first setting operable to control a first aspect of a third device; and
a second setting operable to control a second aspect of a fourth device;
wherein the first aspect and the second aspect are associated with a management function.

19. The system of claim 18, wherein the first device-dependent class comprises:
a first device setting determined based on the first setting and the first device type, the third device type same as the first device type; and
a second device setting determined based on the first setting and the first device type, the fourth device type same as the first device type and the first aspect different from the second aspect.

20. The system of claim 19, wherein the first melded profile comprises:
the first device-dependent class, the first-device dependent class associated with the first group; and
a third device-dependent class associated with the first group and the first aspect;
wherein:
the first device is associated with the first group; and
the first device setting of the first device-dependent class is combined with the first device setting of the third device-dependent class by selecting at least one of:
a priority of the first device setting;
a list of the first device setting; and
a computation based on the first device setting.

21. The system of claim 16, the server further configured to:
access a translation mapping a plurality of input strings into a plurality of output strings;
select, from the first melded profile, a variable string;
map, based on the translation, the variable string to a variable value; and
replace, in the first melded profile, the variable string with the variable value.

22. The system of claim 16, the server further configured to:
receive, from the first agent, a configuration of the first device;
select, responsive to the receiving of the configuration, based on the configuration, a third group; and
associate, responsive to the selection, the first device with the third group.

23. The system of claim 16, the server further configured to:
receive, from the first agent, a configuration of the first device;
create, responsive to the receiving of the configuration, based on the first device type, the first configuration class, and the configuration, a third device-dependent class;
meld, responsive to the creating, based on the first group, the third device-dependent class into a third melded profile; and apply, responsive to the third melded profile being different from the first melded profile, the third melded profile to the first device.

24. The system of claim 16, the server further configured to:
   send, to the first agent, responsive to the indication that the first device is lost, an instruction indicating that the first device is lost.

25. The system of claim 16, the first agent further configured to:
   receive the indication that the first device is lost; and
   modify, responsive to the receiving, a frequency of contacting the server to be more frequent.

26. The system of claim 16, the first agent further configured to:
   receive the indication that the first device is lost;
   determine, responsive to the receiving, an indication of an activity on the first device, the indication based on a detection of one condition selected from:
      an unlocking of the first device;
      a movement of the first device; and
      a starting of an application on the first device;
   acquire, responsive to the indication of the activity, an image from a camera on the first device; and
   transmit, to the server responsive to the acquiring, the image.

27. The system of claim 16, the server further configured to:
   receive, from the first agent, a record of cellular data usage on the first device;
   access, responsive to receiving the record of cellular data usage, a third configuration class associated with the first device, the third configuration class including one configuration selected from:
      an enabling of data roaming;
      a setting of maximum utilized bandwidth; and
      an enabling of cellular data based on time of day;
   create, based on the first device type and the third configuration class, a third device-dependent class;
   meld, based on the first group, the third device-dependent class into a third melded profile; and
   apply, responsive to the melding, the third melded profile to the first device.

28. The system of claim 16, the server further configured to:
   access the first configuration class including a first plurality of device-independent settings;
   use the first configuration class including the plurality of first device-independent settings to create a plurality of first device-dependent classes for the first device; and
   meld, based on the first group, the first plurality of device-dependent classes into the first melded profile.

29. The system of claim 16, the server further configured to:
   use a priority of each of the first plurality of device-dependent classes to generate the first melded profile.

30. The system of claim 16, the server further configured to:
   access the first configuration class including a first device-independent setting for at least one of an application on the first device and an operating system of the first device; and
   use the first configuration class including the first device-independent setting to create a first device-dependent class for the first device.

* * * * *